US012634510B2

(12) United States Patent
Puri et al.

(10) Patent No.: US 12,634,510 B2
(45) Date of Patent: May 19, 2026

(54) ADAPTIVE MOTION VECTOR RESOLUTION (AMVR) USING DEPTH MAP OR MOTION MAP

(71) Applicant: InterDigital CE Patent Holdings, SAS, Paris (FR)

(72) Inventors: Saurabh Puri, Saint-Lazare (CA); Tangi Poirier, Thorigné-Fouillard (FR); Gaëlle Martin-Cocher, Toronto (CA); Karam Naser, Mouazé (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 0 days.

(21) Appl. No.: 18/722,562

(22) PCT Filed: Dec. 21, 2022

(86) PCT No.: PCT/EP2022/087246
§ 371 (c)(1),
(2) Date: Jun. 20, 2024

(87) PCT Pub. No.: WO2023/118301
PCT Pub. Date: Jun. 29, 2023

(65) Prior Publication Data
US 2025/0071317 A1     Feb. 27, 2025

(30) Foreign Application Priority Data

Dec. 21, 2021     (EP) ..................................... 21306882

(51) Int. Cl.
*H04N 19/52*          (2014.01)
*H04N 19/103*         (2014.01)
(Continued)

(52) U.S. Cl.
CPC ........... *H04N 19/52* (2014.11); *H04N 19/139* (2014.11); *H04N 19/176* (2014.11); *H04N 19/597* (2014.11)

(58) Field of Classification Search
None
See application file for complete search history.

(56) References Cited

U.S. PATENT DOCUMENTS 10,638,137 B2      4/2020   Xu et al.
2021/0092434 A1 *  3/2021   Huang ................... H04N 19/70

FOREIGN PATENT DOCUMENTS

WO      WO-2019244055 A1 * 12/2019   ........... H04N 19/176

OTHER PUBLICATIONS

Guo et al., "Adaptive Motion Vector Resolution with Implicit Signaling", Proceedings of 2010 IEEE 17th International Conference on Image Processing, Technicolor Corporate Research, Princeton, NJ, USA, Sep. 26-29, 2010, pp. 2057-2060.
(Continued)

*Primary Examiner* — Lindsay J Uhl
(74) *Attorney, Agent, or Firm* — Condo Roccia Koptiw LLP

(57) ABSTRACT

A device may obtain an indication of motion associated with a video block. The device may determine a precision level of a motion vector difference associated with the video block based on the indication of motion associated with the video block. The device may decode the motion vector difference associated with the video block using the precision level, for example, if the device is a decoder. The indication of the motion may include one or more of a value of a motion vector predictor (MVP), motion information e.g. motion intensity, or depth information, which indicates a distance associated with the video block from a reference point.

19 Claims, 18 Drawing Sheets

(51) Int. Cl.

| | |
|---|---|
| *H04N 19/124* | (2014.01) |
| *H04N 19/132* | (2014.01) |
| *H04N 19/139* | (2014.01) |
| *H04N 19/169* | (2014.01) |
| *H04N 19/176* | (2014.01) |
| *H04N 19/597* | (2014.01) |

(56) References Cited

OTHER PUBLICATIONS

Ma et al., "Progressive Motion Vector Resolution for HEVC", 2013 Visual Communications and Image Processing (VCIP), IEEE, 2013, 6 pages.

McCann et al., "Samsung's Response to the Call for Proposals on Video Compression Technology", JCTVC A124, Samsung Electronics Co., Ltd., and British Broadcasting Corporation, Joint Collaborative Team on Video Coding (JCT-VC) of ITU T SG16 WP3 and ISO/IEC JTC1/SC29/WG11, 1st Meeting: Dresden, DE, Apr. 15-23, 2010, pp. 1-40.

Ray et al., "A Block Level Adaptive MV Resolution for Video Coding", Proceedings of the IEEE International Conference on Multimedia and Expo (ICME) 2017, Jul. 10-14, 2017, pp. 49-54.

Ray et al., "Flexible Motion Vector Resolution Prediction for Video Coding", IEEE Transactions on Circuits and Systems for Video Technology, vol. 29, No. 11, Nov. 2019, pp. 3302-3316.

Ribas-Corbera et al., "Optimizing Motion-vector Accuracy in Block-based Video Coding", IEEE Transactions on Circuits and Systems for Video Technology, vol. 11, No. 4, Apr. 2001, pp. 497-511.

Wang et al., "Adaptive Motion Vector Resolution Scheme for Enhanced Video Coding", 2016 Data Compression Conference (DCC), IEEE, 2016, pp. 101-110.

Xiu et al., "CE4-related: Modified adaptive motion vector resolution (AMVR) for affine mode", JVET of ITU-T SG 16 WP 3 and ISO/IEC JTC 1/SC 29/WG 11, 15th Meeting: Gothenburg, SE, JVET-O0595, Jul. 3-12, 2019, 3 pages.

Ji et al., "Block-Wise Adaptive Motion Accuracy Based B-Picture Coding With Low-Complexity Motion Compensation", IEEE Transactions on Circuits and Systems For Video Technology, vol. 17, No. 8, Aug. 2007, pp. 1085-1090.

Zhang et al., "Direct Techniques for Optimal Sub-Pixel Motion Accuracy Estimation and Position Prediction", IEEE Transactions on Circuits and Systems For Video Technology, vol. 20, No. 12, Dec. 2010, pp. 1735-1744.

* cited by examiner

FIG. 4

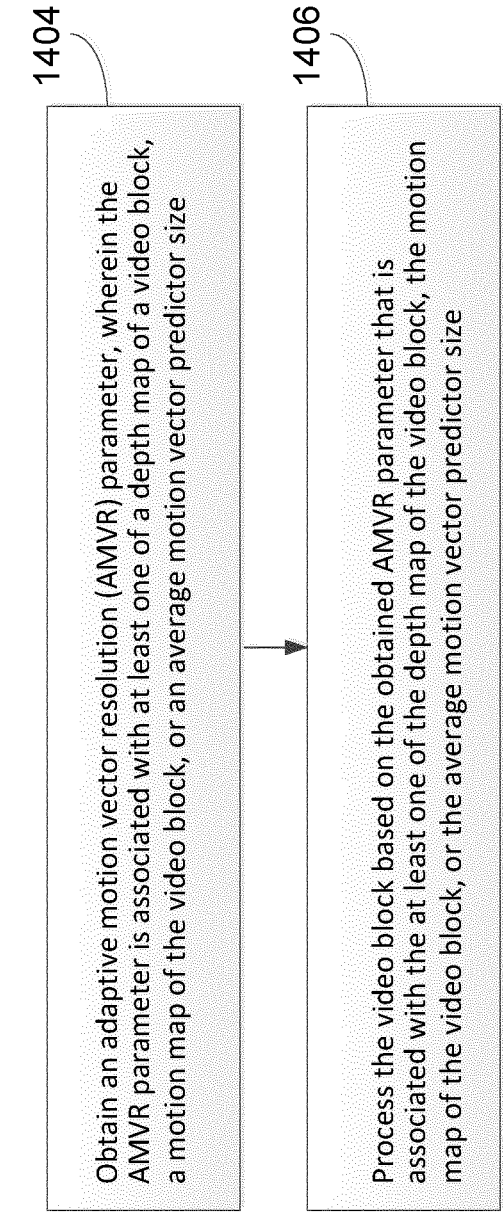

1400

1404

Obtain an adaptive motion vector resolution (AMVR) parameter, wherein the AMVR parameter is associated with at least one of a depth map of a video block, a motion map of the video block, or an average motion vector predictor size

1406

Process the video block based on the obtained AMVR parameter that is associated with the at least one of the depth map of the video block, the motion map of the video block, or the average motion vector predictor size

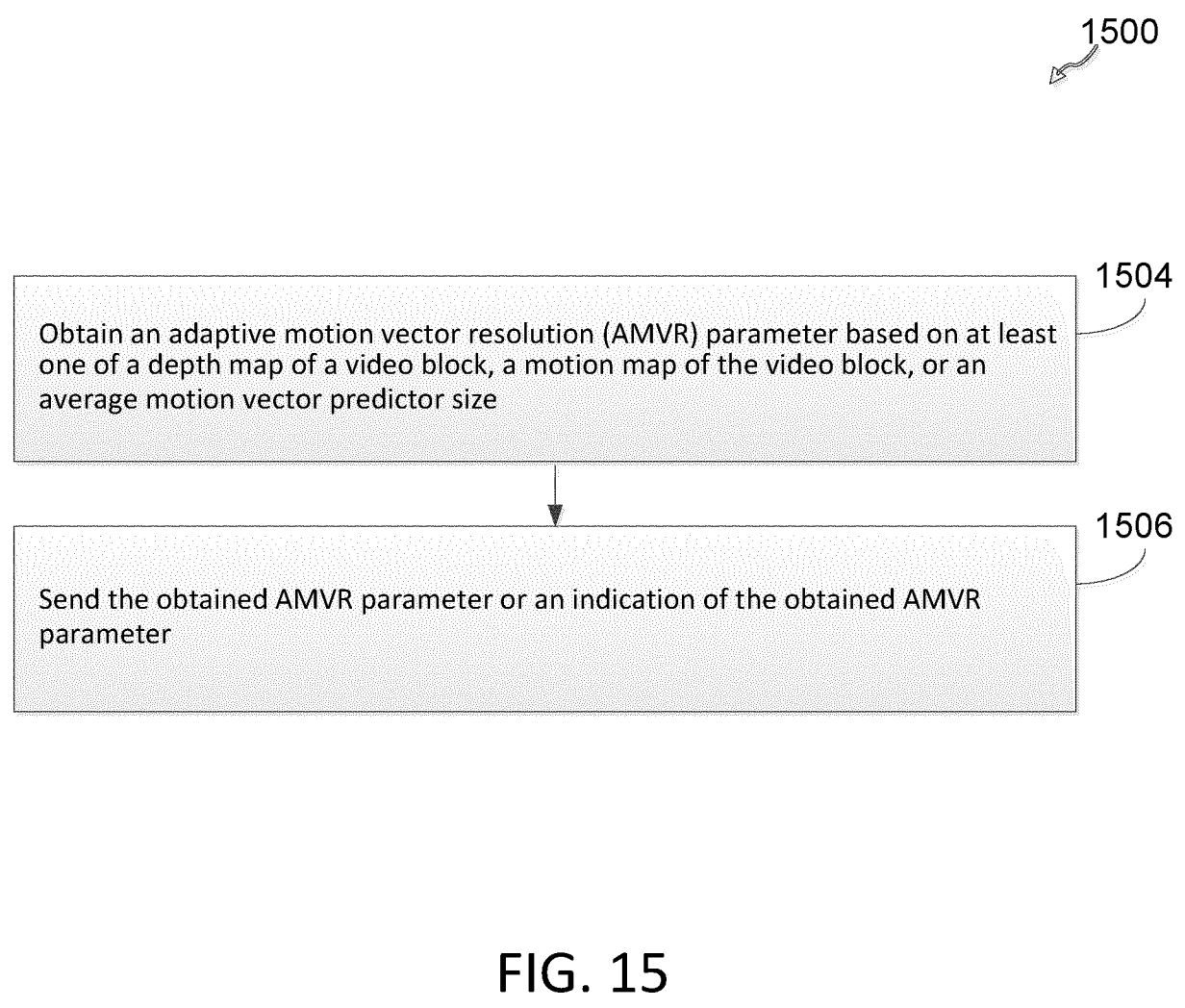

Obtain an adaptive motion vector resolution (AMVR) parameter based on at least one of a depth map of a video block, a motion map of the video block, or an average motion vector predictor size

1506

Send the obtained AMVR parameter or an indication of the obtained AMVR parameter

FIG. 15

ADAPTIVE MOTION VECTOR RESOLUTION (AMVR) USING DEPTH MAP OR MOTION MAP

CROSS REFERENCE TO RELATED APPLICATIONS

This application is the National Stage Entry under 35 U.S.C. § 371 of Patent Cooperation Treaty Application No. PCT/EP2022/087246, filed Dec. 21, 2022, which claims priority to EP Provisional Patent Application No. 21/306, 882.8, filed on Dec. 21, 2021, and entitled "Adaptive Motion Vector Resolution Using Depth Map or Motion Map," the entireties of which are incorporated by reference as if fully set forth herein.

BACKGROUND

Video encoding and/or decoding may be performed using block-based, wavelet-based, and/or object-based systems. A block-based hybrid video coding system may be deployed.

SUMMARY

Systems, methods, and instrumentalities are disclosed for determining a precision level of a motion vector based on the indication of motion for a video block.

A device may obtain an indication of motion associated with a video block. The device may determine a precision level of motion vector information (e.g., a motion vector difference (MVD)) associated with the video block based on the indication of motion associated with the video block. The device may decode the motion vector information associated with the video block using the precision level, for example, if the device is a decoder. The device may encode the motion vector information associated with the video block using the precision level, for example, if the device is an encoder.

The device may receive the motion vector information in video data signaled to the device, for example, if the device is a decoder. The video data may not include the precision level of the motion vector information associated with the video block. The device may determine the precision level based on the indication of motion associated with the video block.

A device may determine an adaptive motion vector resolution (AMVR) index for a video block based on the indication of motion associated with the video block. AMVR may be enabled for the video block. The device may perform AMVR by determining an AMVR index for the video block based on the indication of motion associated with the video block. The AMVR index may indicate the precision level of an MVD associated with the video block, and the precision level of the MVD may be determined based on the AMVR index.

The indication of the motion may include one or more of motion information, depth information, or a value of a motion vector predictor (MVP). An MVP associated with a video block may indicate a motion associated with an adjacent block of the video block. The motion information associated with the video block may indicate a motion intensity associated with the video block. The depth information associated with the video block may indicate a distance associated with the video block from a reference point (e.g., a distance from a virtual camera).

In example, the device may receive an MVD associated with the video block in video data signaled to the device.

The video data may indicate a set of precision levels, and the device may determine the precision level of the MVD based on the set of precision levels.

A device may modify or reorder an AMVR set based on an indication of motion associated with the video block. The indication of motion may include one or more of motion information associated with the video block, depth information associated with the video block, or a value of a motion vector predictor (MVP) associated with the video block.

A device may determine an AMVR index from a set of AMVR indices for a video block. The device may obtain a set of AMVR indices and perform AMVR by selecting an AMVR index for the video block from the set of AMVR indices based on the indication of motion associated with the video block.

A device may select an AMVR set for a video block based on the indication of motion associated with the video block. The device may obtain a plurality of AMVR sets and perform AMVR by selecting an AMVR set for the video block from the plurality of AMVR sets based on the indication of motion associated with the video block. An AMVR index of the selected AMVR set may indicate the precision level of an MVD associated with the video block.

BRIEF DESCRIPTION OF THE DRAWINGS

FIG. 4 illustrates an example of a system in which various aspects and examples may be implemented.

FIG. 14 illustrates an example of a method for obtaining an AMVR parameter (e.g., an AMVR parameter associated with at least one of a depth map of a video block, a motion map of the video block, or an average motion vector predictor size.

FIG. 15 illustrates an example of a method for sending an obtained AMVR parameter or an indication of the obtained AMVR parameter.

DETAILED DESCRIPTION

A more detailed understanding may be had from the following description, given by way of example in conjunction with the accompanying drawings.

Figure 1A:
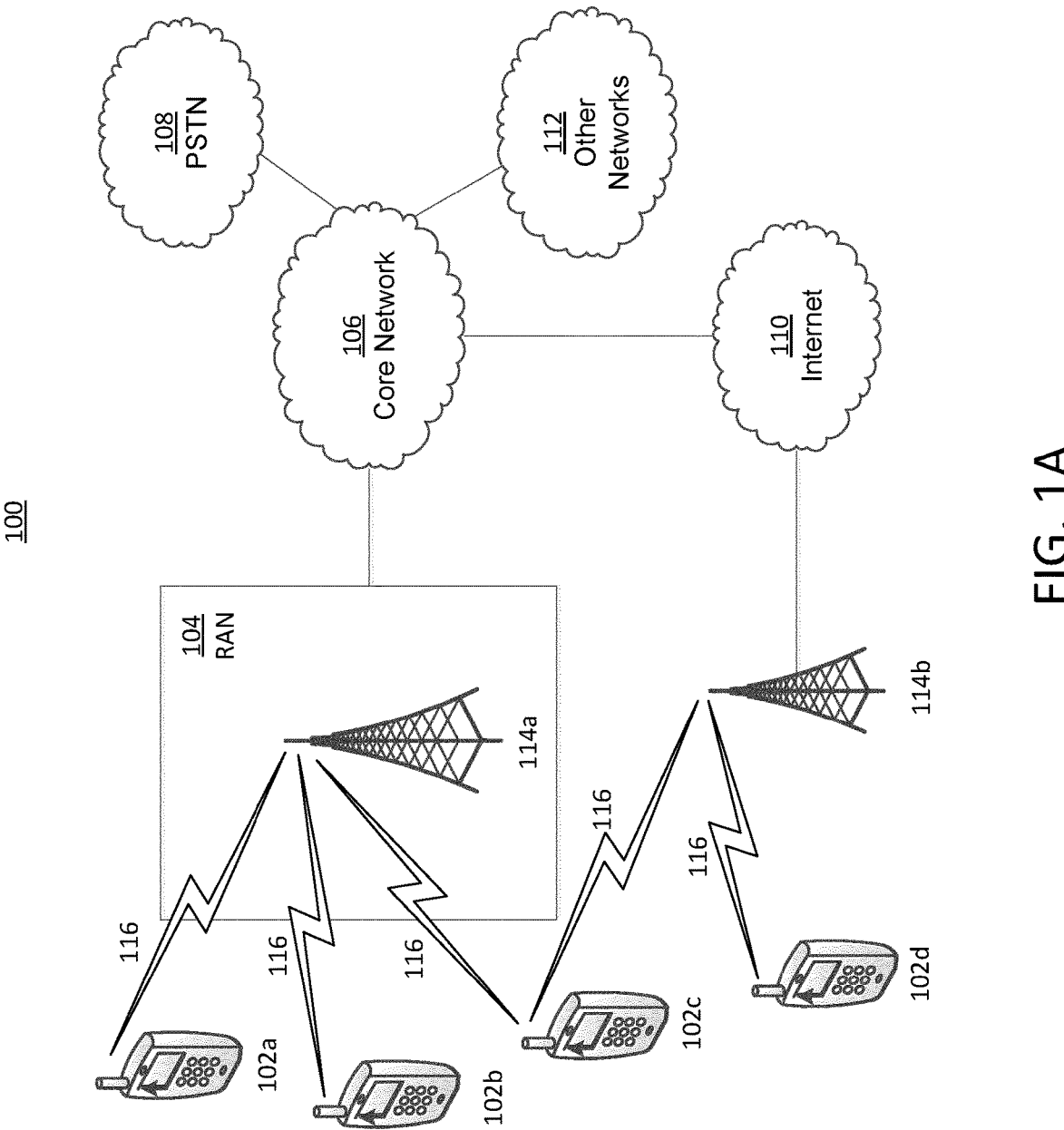
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
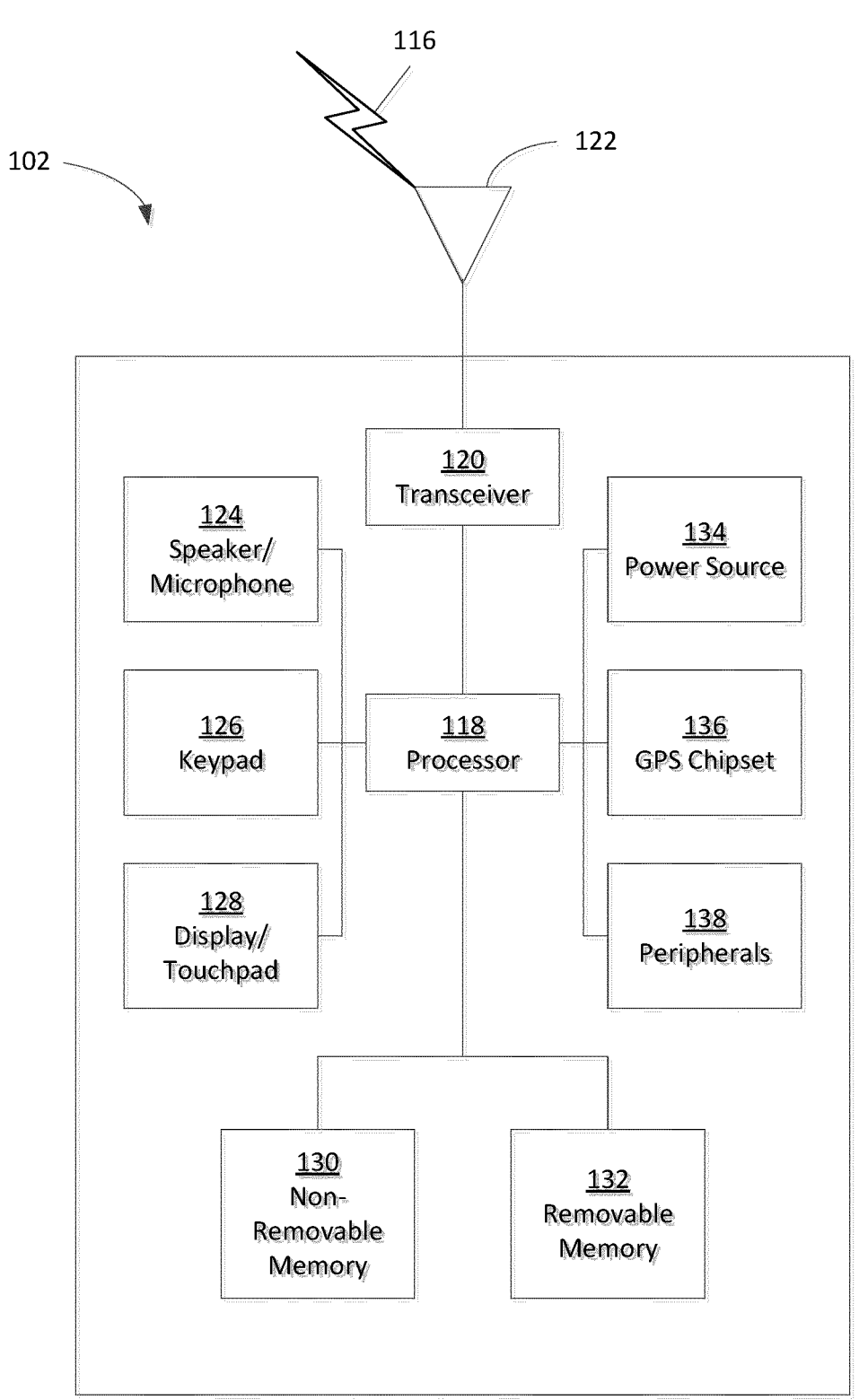
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception).

Figure 1C:
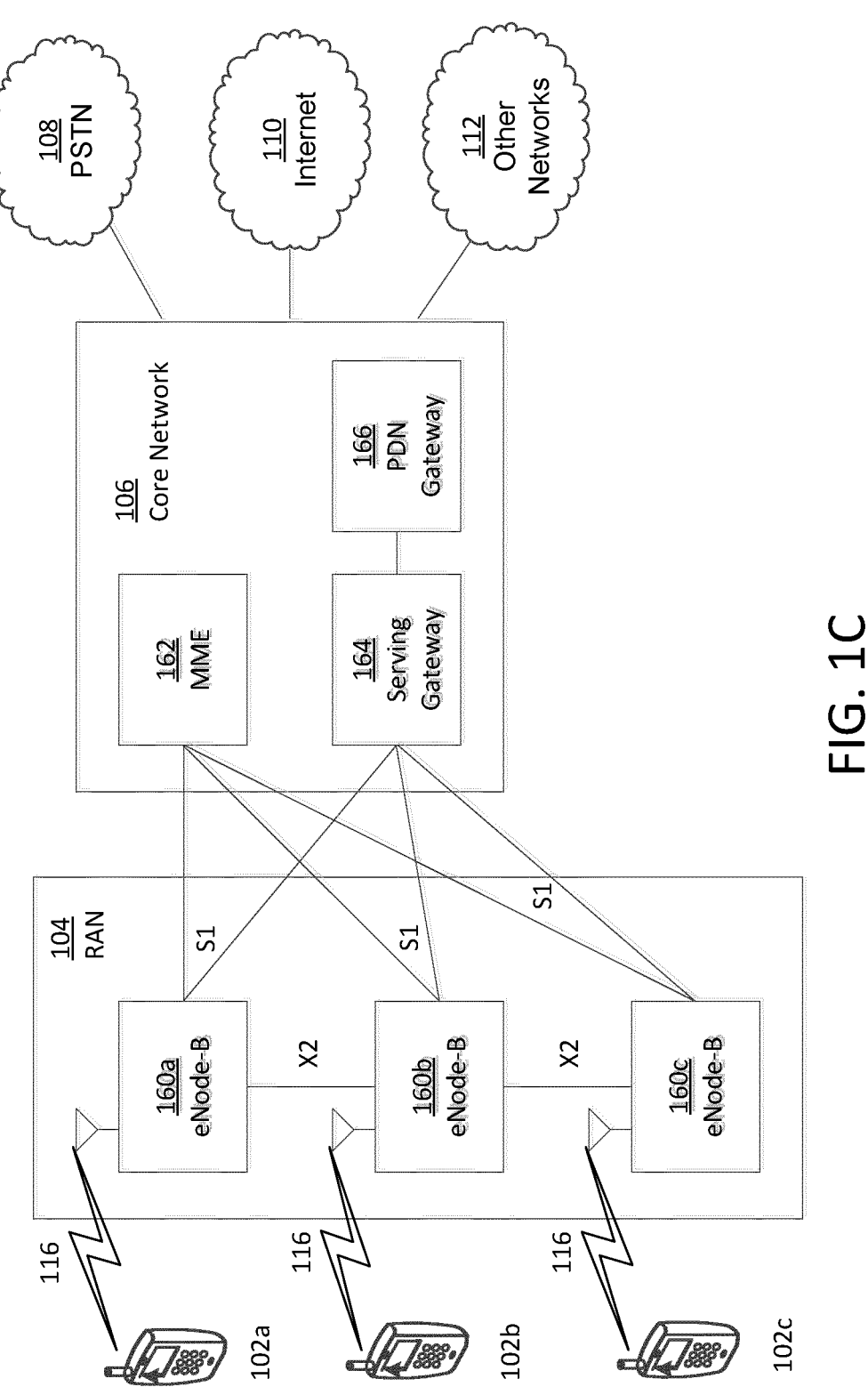
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHZ, 40 MHZ, 80 MHZ, and/or 160 MHz wide channels. The 40 MHZ, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
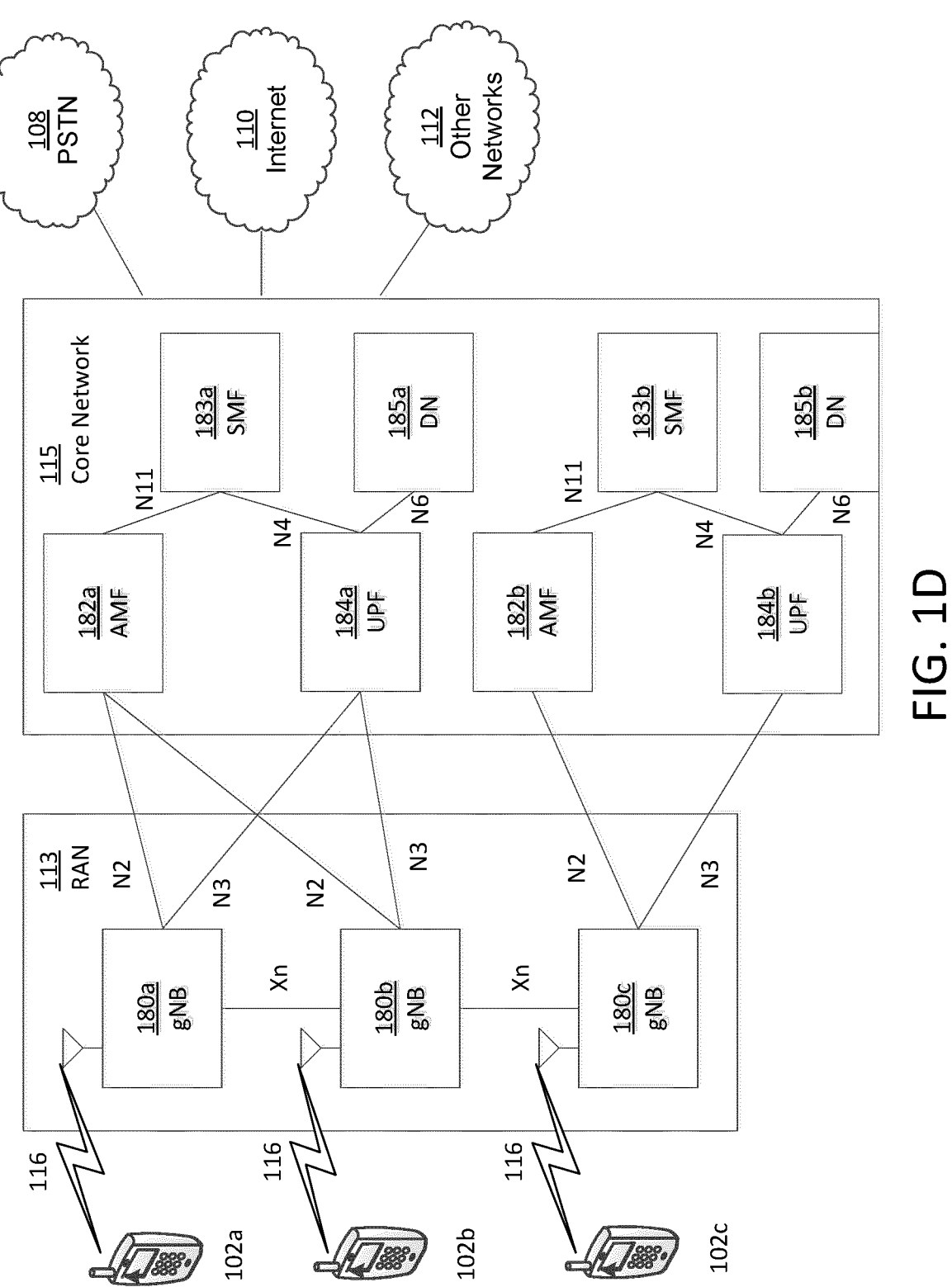
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

This application describes a variety of aspects, including tools, features, examples, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects may be combined and interchanged to provide further aspects. Moreover, the aspects may be combined and interchanged with aspects described in earlier filings as well.

The aspects described and contemplated in this application may be implemented in many different forms. FIGS. 5-15 described herein may provide some examples, but other examples are contemplated. The discussion of FIGS. 5-15 does not limit the breadth of the implementations. At least one of the aspects generally relates to video encoding and decoding, and at least one other aspect generally relates to transmitting a bitstream generated or encoded. These and other aspects may be implemented as a method, an apparatus, a computer readable medium (e.g., storage medium) comprising (e.g., having stored thereon) instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various examples to modify an element, component, step, operation, etc., such as, for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Figure 2:
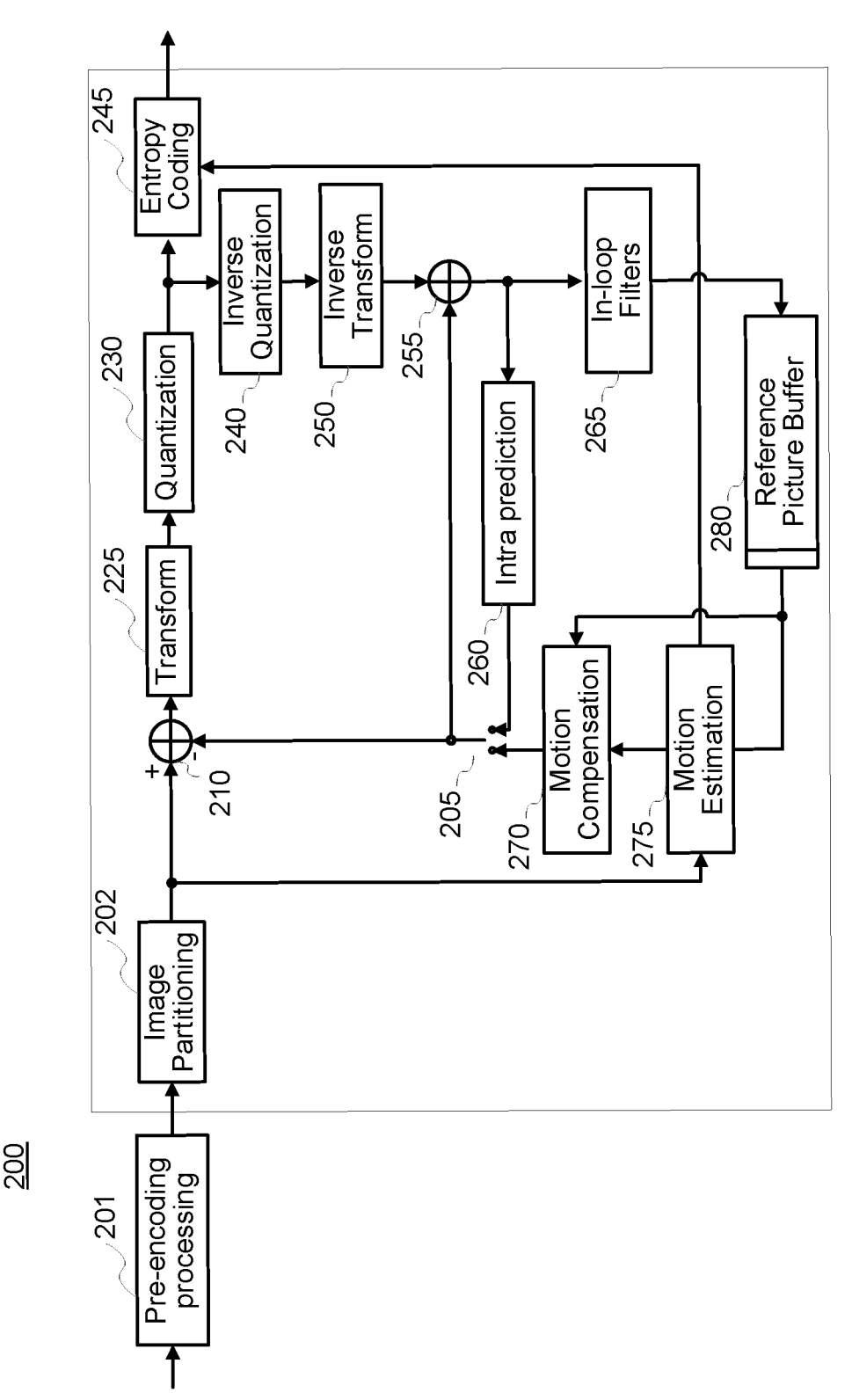
FIG. 2 illustrates an example video encoder.
Figure 3:
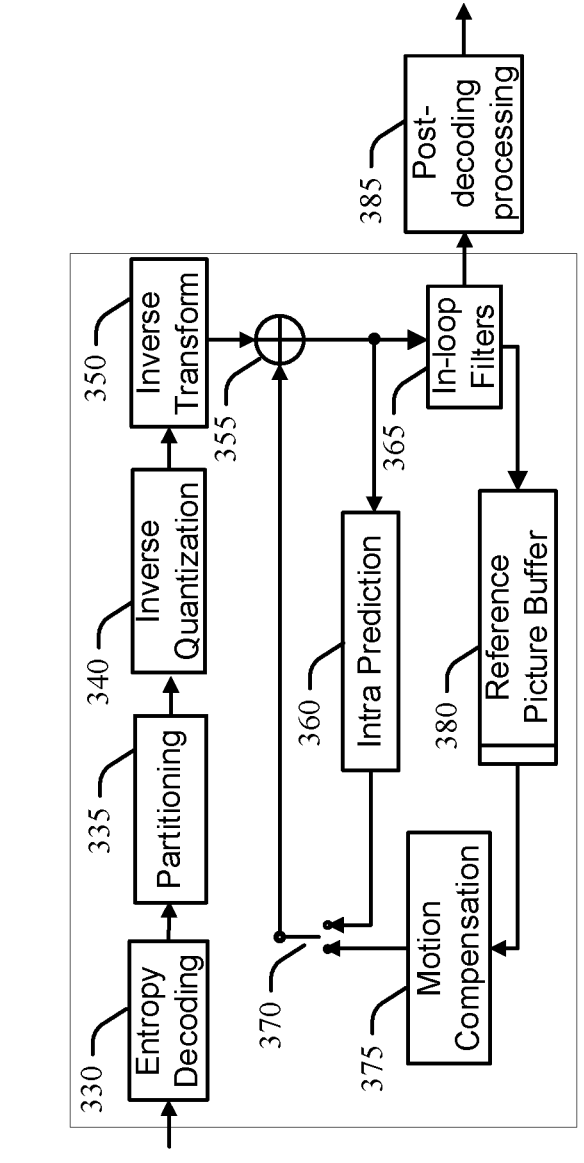
FIG. 3 illustrates an example video decoder.

Various methods and other aspects described in this application may be used to modify modules, for example, decoding modules, of a video encoder 200 and decoder 300 as shown in FIG. 2 and FIG. 3. Moreover, the subject matter disclosed herein may be applied, for example, to any type, format or version of video coding, whether described in a standard or a recommendation, whether pre-existing or future-developed, and extensions of any such standards and recommendations. Unless indicated otherwise, or technically precluded, the aspects described in this application may be used individually or in combination.

Various numeric values are used in examples described the present application, such as 1/4-pel, 1/2-pel, 1-pel, etc. These and other specific values are for purposes of describing examples and the aspects described are not limited to these specific values.

FIG. 2 is a diagram showing an example video encoder. Variations of example encoder 200 are contemplated, but the encoder 200 is described below for purposes of clarity without describing all expected variations.

Before being encoded, the video sequence may go through pre-encoding processing 201, for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata may be associated with the pre-processing, and attached to the bitstream.

In the encoder 200, a picture is encoded by the encoder elements as described below. The picture to be encoded is partitioned 202 and processed in units of, for example, coding units (CUs). Each unit is encoded using, for example, either an intra or inter mode. When a unit is encoded in an intra mode, it performs intra prediction 260. In an inter mode, motion estimation 275 and compensation 270 are performed. The encoder decides 205 which one of the intra mode or inter mode to use for encoding the unit, and indicates the intra/inter decision by, for example, a prediction mode flag. Prediction residuals are calculated, for example, by subtracting 210 the predicted block from the original image block.

The prediction residuals are then transformed 225 and quantized 230. The quantized transform coefficients, as well as motion vectors and other syntax elements, are entropy coded 245 to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized 240 and inverse transformed 250 to decode prediction residuals. Combining 255 the decoded prediction residuals and the predicted block, an image block is reconstructed. In-loop filters 265 are applied to the reconstructed picture to perform, for example, deblocking/SAO (Sample Adaptive Offset) filtering to reduce encoding artifacts. The filtered image is stored at a reference picture buffer (280).

FIG. 3 is a diagram showing an example of a video decoder. In example decoder 300, a bitstream is decoded by the decoder elements as described below. Video decoder 300 generally performs a decoding pass reciprocal to the encoding pass as described in FIG. 2. The encoder 200 also generally performs video decoding as part of encoding video data.

In particular, the input of the decoder includes a video bitstream, which may be generated by video encoder 200. The bitstream is first entropy decoded 330 to obtain transform coefficients, motion vectors, and other coded information. The picture partition information indicates how the picture is partitioned. The decoder may therefore divide 335 the picture according to the decoded picture partitioning information. The transform coefficients are de-quantized 340 and inverse transformed 350 to decode the prediction residuals. Combining 355 the decoded prediction residuals and the predicted block, an image block is reconstructed. The predicted block may be obtained 370 from intra prediction 360 or motion-compensated prediction (i.e., inter prediction) 375. In-loop filters 365 are applied to the reconstructed image. The filtered image is stored at a reference picture buffer 380.

The decoded picture can further go through post-decoding processing 385, for example, an inverse color transform (e.g., conversion from YCbCr 4:2:0 to RGB 4:4:4) or an inverse remapping performing the inverse of the remapping process performed in the pre-encoding processing 201. The post-decoding processing can use metadata derived in the pre-encoding processing and signaled in the bitstream. In an example, the decoded images (e.g., after application of the in-loop filters 365 and/or after post-decoding processing 385, if post-decoding processing is used) may be sent to a display device for rendering to a user.

Figure 4:
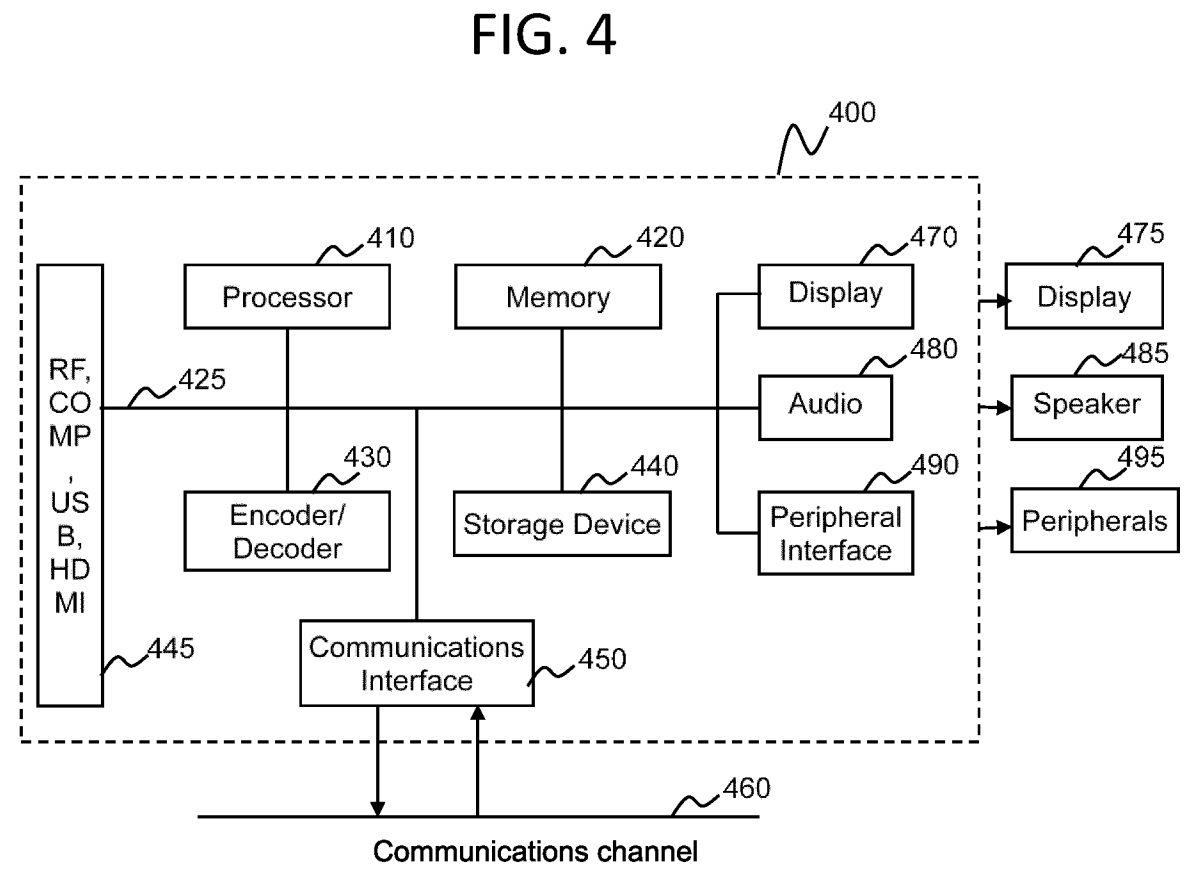

FIG. 4 is a diagram showing an example of a system in which various aspects and examples described herein may be implemented. System 400 may be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 400, singly or in combination, may be embodied in a single integrated circuit (IC), multiple ICs, and/or discrete components. For example, in at least one example, the processing and encoder/decoder elements of system 400 are distributed across multiple ICs and/or discrete components. In various examples, the system 400 is communicatively coupled to one or more other systems, or other electronic devices, via, for example, a communications bus or through dedicated input and/or output ports. In various examples, the system 400 is configured to implement one or more of the aspects described in this document.

The system 400 includes at least one processor 410 configured to execute instructions loaded therein for implementing, for example, the various aspects described in this document. Processor 410 can include embedded memory, input output interface, and various other circuitries as known in the art. The system 400 includes at least one memory 420 (e.g., a volatile memory device, and/or a non-volatile memory device). System 400 includes a storage device 440, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 440 can include an internal storage device, an attached storage device (including detachable and non-detachable storage devices), and/or a network accessible storage device, as non-limiting examples.

System 400 includes an encoder/decoder module 430 configured, for example, to process data to provide an encoded video or decoded video, and the encoder/decoder module 430 can include its own processor and memory. The encoder/decoder module 430 represents module(s) that may be included in a device to perform the encoding and/or decoding functions. As is known, a device can include one or both of the encoding and decoding modules. Additionally, encoder/decoder module 430 may be implemented as a separate element of system 400 or may be incorporated within processor 410 as a combination of hardware and software as known to those skilled in the art.

Program code to be loaded onto processor 410 or encoder/decoder 430 to perform the various aspects described in this document may be stored in storage device 440 and subsequently loaded onto memory 420 for execution by processor 410. In accordance with various examples, one or more of processor 410, memory 420, storage device 440, and encoder/decoder module 430 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some examples, memory inside of the processor 410 and/or the encoder/decoder module 430 is used to store instructions and to provide working memory for processing that is needed during encoding or decoding. In other examples, however, a memory external to the processing device (for example, the processing device may be either the processor 410 or the encoder/decoder module 430) is used for one or more of these functions. The external memory may be the memory 420 and/or the storage device 440, for example, a dynamic volatile memory and/or a non-volatile flash memory. In several examples, an external non-volatile flash memory is used to store the operating system of, for example, a television. In at least one example, a fast external dynamic volatile memory such as a RAM is used as working memory for video encoding and decoding operations.

The input to the elements of system 400 may be provided through various input devices as indicated in block 445. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 4, include composite video.

In various examples, the input devices of block 445 have associated respective input processing elements as known in the art. For example, the RF portion may be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which may be referred to as a channel in certain examples, (iv) demodulating the downconverted and band-limited signal, (v) performing error correction, and/or (vi) demultiplexing to select the desired stream of data packets. The RF portion of various examples includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box example, the RF portion and its associated input processing element receives an RF signal transmitted over a wired (for example, cable) medium, and performs frequency selection by filtering, downconverting, and filtering again to a desired frequency band. Various examples rearrange the order of the above-described (and other) elements, remove some of these elements, and/or add other elements performing similar or different functions. Adding elements can include inserting elements in between existing elements, such as, for example, inserting amplifiers and an analog-to-digital converter. In various examples, the RF portion includes an antenna.

The USB and/or HDMI terminals can include respective interface processors for connecting system 400 to other electronic devices across USB and/or HDMI connections. It is to be understood that various aspects of input processing, for example, Reed-Solomon error correction, may be implemented, for example, within a separate input processing IC or within processor 410 as necessary. Similarly, aspects of USB or HDMI interface processing may be implemented within separate interface ICs or within processor 410 as necessary. The demodulated, error corrected, and demultiplexed stream is provided to various processing elements, including, for example, processor 410, and encoder/decoder 430 operating in combination with the memory and storage elements to process the data stream as necessary for presentation on an output device.

Various elements of system 400 may be provided within an integrated housing, Within the integrated housing, the various elements may be interconnected and transmit data therebetween using suitable connection arrangement 425, for example, an internal bus as known in the art, including the Inter-IC (I2C) bus, wiring, and printed circuit boards.

The system 400 includes communication interface 450 that enables communication with other devices via communication channel 460. The communication interface 450 can include, but is not limited to, a transceiver configured to transmit and to receive data over communication channel 460. The communication interface 450 can include, but is not limited to, a modem or network card and the communication channel 460 may be implemented, for example, within a wired and/or a wireless medium.

Data is streamed, or otherwise provided, to the system 400, in various examples, using a wireless network such as a Wi-Fi network, for example IEEE 802.11 (IEEE refers to the Institute of Electrical and Electronics Engineers). The Wi-Fi signal of these examples is received over the communications channel 460 and the communications interface 450 which are adapted for Wi-Fi communications. The communications channel 460 of these examples is typically connected to an access point or router that provides access to external networks including the Internet for allowing streaming applications and other over-the-top communications. Other examples provide streamed data to the system 400 using a set-top box that delivers the data over the HDMI connection of the input block 445. Still other examples provide streamed data to the system 400 using the RF connection of the input block 445. As indicated above, various examples provide data in a non-streaming manner. Additionally, various examples use wireless networks other than Wi-Fi, for example a cellular network or a Bluetooth® network.

The system 400 can provide an output signal to various output devices, including a display 475, speakers 485, and other peripheral devices 495. The display 475 of various examples includes one or more of, for example, a touch-screen display, an organic light-emitting diode (OLED) display, a curved display, and/or a foldable display. The display 475 may be for a television, a tablet, a laptop, a cell phone (mobile phone), or other device. The display 475 can also be integrated with other components (for example, as in a smart phone), or separate (for example, an external monitor for a laptop). The other peripheral devices 495 include, in various examples, one or more of a stand-alone digital video disc (or digital versatile disc) (DVD, for both terms), a disk player, a stereo system, and/or a lighting system. Various examples use one or more peripheral devices 495 that provide a function based on the output of the system 400. For example, a disk player performs the function of playing the output of the system 400.

In various examples, control signals are communicated between the system 400 and the display 475, speakers 485, or other peripheral devices 495 using signaling such as AV.Link, Consumer Electronics Control (CEC), or other communications protocols that enable device-to-device control with or without user intervention. The output devices may be communicatively coupled to system 400 via dedicated connections through respective interfaces 470, 480, and 490. Alternatively, the output devices may be connected to system 400 using the communications channel 460 via the communications interface 450. The display 475 and speakers 485 may be integrated in a single unit with the other components of system 400 in an electronic device such as, for example, a television. In various examples, the display interface 470 includes a display driver, such as, for example, a timing controller (T Con) chip.

The display 475 and speakers 485 can alternatively be separate from one or more of the other components, for example, if the RF portion of input 445 is part of a separate set-top box. In various examples in which the display 475 and speakers 485 are external components, the output signal may be provided via dedicated output connections, including, for example, HDMI ports, USB ports, or COMP outputs.

The examples may be carried out by computer software implemented by the processor 410 or by hardware, or by a combination of hardware and software. As a non-limiting example, the examples may be implemented by one or more integrated circuits. The memory 420 may be of any type appropriate to the technical environment and may be implemented using any appropriate data storage technology, such as optical memory devices, magnetic memory devices, semiconductor-based memory devices, fixed memory, and removable memory, as non-limiting examples. The processor 410 may be of any type appropriate to the technical environment, and can encompass one or more of microprocessors, general purpose computers, special purpose computers, and processors based on a multi-core architecture, as non-limiting examples.

Various implementations include decoding. "Decoding", as used in this application, can encompass all or part of the processes performed, for example, on a received encoded sequence in order to produce a final output suitable for display. In various examples, such processes include one or more of the processes typically performed by a decoder, for example, entropy decoding, inverse quantization, inverse transformation, and differential decoding. In various examples, such processes also, or alternatively, include processes performed by a decoder of various implementations described in this application for example, obtaining an adaptive motion vector resolution (AMVR) parameter associated with at least one of a depth map of a video block, a motion map of the video block, or an average motion vector predictor size; processing the video block based on the obtained AMVR parameter that is associated with the at least one of the depth map of the video block, the motion map of the video block, or the average motion vector predictor size; obtaining the AMVR parameter based on the at least one of the depth map of the video block, the motion map of the video block, or the average motion vector predictor size; receiving an indication of the AMVR parameter, for example, at a slice level via a bitstream; obtaining the AMVR parameter according to the indication of the AMVR parameter; selecting an AMVR index from a plurality of AMVR indices based the at least one of the depth map of the video block, the motion map of the video block, or the average motion vector predictor size; selecting the AMVR set from a plurality of AMVR sets based on the at least one of the depth map of the video block, the motion map of the video block, or the average motion vector predictor size; receiving an indication of the AMVR enablement, for example, at a picture level or at a slice level via a bitstream and processing the video block using the indication of the AMVR enablement; determining a precision level of motion vector information (e.g., a motion vector difference (MVD)) associated with the video block based on the indication of motion associated with the video block; decoding the motion vector information associated with the video block using the precision level.

As further examples, in one example "decoding" refers only to entropy decoding, in another example "decoding" refers only to differential decoding, and in another example "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations include encoding. In an analogous way to the above discussion about "decoding", "encoding" as used in this application can encompass all or part of the processes performed, for example, on an input video sequence in order to produce an encoded bitstream. In various examples, such processes include one or more of the processes typically performed by an encoder, for example, partitioning, differential encoding, transformation, quantization, and entropy encoding. In various examples, such processes also, or alternatively, include processes performed by an encoder of various implementations described in this application, for example, obtaining an AMVR parameter based at least one of a depth map of a video block, a motion map of the video block, or an average motion vector predictor size; sending the obtained AMVR parameter or an indication of the obtained AMVR parameter; sending the obtained AMVR parameter or an indication of the obtained AMVR parameter, for example, to a device in a bitstream;

sending the indication of the AMVR parameter at a slice level; determining whether to enable AMVR for the video block and sending an indication of whether to enable AMVR for the video block in a bitstream, for example, at a picture level or at a slice level; selecting the AMVR index from a plurality of AMVR indices based on the at least one of the depth map of the video block, the motion map of the video block, or the average motion vector predictor size; selecting the AMVR set from a plurality of AMVR sets based on the at least one of the depth map of the video block, the motion map of the video block, or the average motion vector predictor size; determining a precision level of motion vector information (e.g., a motion vector difference (MVD)) associated with the video block based on the indication of motion associated with the video block; encoding the motion vector information associated with the video block using the precision level.

As further examples, in one example "encoding" refers only to entropy encoding, in another example "encoding" refers only to differential encoding, and in another example "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that syntax elements as used herein, for example, sh_amvr_enabled_flag, ph_amvr_enabled_flag, sh_signal_amvr_set_flag, sh_amvr_set_idc, sh_num_amvr_set, or amvr_precision_set [i], etc., are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein may be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus may be implemented in, for example, appropriate hardware, software, and firmware. The methods may be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one example" or "an example" or "one implementation" or "an implementation", as well as other variations thereof, means that a particular feature, structure, characteristic, and so forth described in connection with the example is included in at least one example. Thus, the appearances of the phrase "in one example" or "in an example" or "in one implementation" or "in an implementation", as well any other variations, appearing in various places throughout this application are not necessarily all referring to the same example.

Additionally, this application may refer to "determining" various pieces of information. Determining the information can include one or more of, for example, estimating the information, calculating the information, predicting the information, or retrieving the information from memory. Obtaining may include receiving, retrieving, constructing, generating, and/or determining.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. Encoder signals may include, for example, an indication of a depth map and/or a motion map, an encoding function on a depth map and/or a motion map, etc. In this way, in an example the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various examples. It is to be appreciated that signaling may be accomplished in a variety of ways. For example, one or more syntax elements, flags, and so forth are used to signal information to a corresponding decoder in various examples. While the preceding relates to the verb form of the word "signal", the word "signal" can also be used herein as a noun.

As will be evident to one of ordinary skill in the art, implementations may produce a variety of signals formatted to carry information that may be, for example, stored or transmitted. The information can include, for example, instructions for performing a method, or data produced by one of the described implementations. For example, a signal may be formatted to carry the bitstream of a described example. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on, or accessed or received from, a processor-readable medium.

Many examples are described herein. Features of examples may be provided alone or in any combination, across various claim categories and types. Further, examples may include one or more of the features, devices, or aspects described herein, alone or in any combination, across various claim categories and types. For example, features described herein may be implemented in a bitstream or signal that includes information generated as described herein. The information may allow a decoder to decode a bitstream, the encoder, bitstream, and/or decoder according to any of the embodiments described. For example, features described herein may be implemented by creating and/or transmitting and/or receiving and/or decoding a bitstream or signal. For example, features described herein may be implemented a method, process, apparatus, medium storing instructions (e.g., computer-readable medium), medium storing data, or signal. For example, features described herein may be implemented by a TV, set-top box, cell phone, tablet, or other electronic device that performs decoding. The TV, set-top box, cell phone, tablet, or other electronic device may display (e.g., using a monitor, screen, or other type of display) a resulting image (e.g., an image from residual reconstruction of the video bitstream). The TV, set-top box, cell phone, tablet, or other electronic device may receive a signal including an encoded image and perform decoding.

A device may obtain an adaptive motion vector resolution (AMVR) parameter. The AMVR parameter may be associated with at least one of a depth map of a video block, a motion map of the video block, or an average motion vector predictor size. The device may process the video block based on the obtained AMVR parameter that is associated with at least one of the depth map of the video block, the motion map of the video block, or the average motion vector predictor size. The device may receive an indication of the AMVR parameter, for example, at a slice level via a bitstream. The device may obtain the AMVR parameter according to the indication of the AMVR parameter. The obtained AMVR parameter may include an AMVR index. The device may select the AMVR index from a plurality of AMVR indices based on at least one of the depth map of the video block, the motion map of the video block, or the average motion vector predictor size. The obtained AMVR parameter may include an AMVR set. The device may receive a plurality of AMVR indices, for example, at a picture level (e.g., in a picture header) or at a slice level (e.g., in a slice header) via a bitstream.

The device may select a precision level of an MVD based on a set of precision levels. The precision level of the MVD may be determined based on an AMVR index. In examples, the device may select the AMVR set from a plurality of AMVR sets based on at least one of the depth map of the video block, the motion map of the video block, or the average motion vector predictor size. The device may receive an indication of the AMVR enablement, for example, at a picture level or at a slice level via a bitstream, and the device may process the video block using the indication of the AMVR enablement. The device may receive a plurality of AMVR sets, for example, at a picture level (e.g., in a picture header) or at a slice level (e.g., in a slice header) via a bitstream.

A device may obtain an AMVR parameter based on at least one of a depth map of a video block, a motion map of the video block, or an average motion vector predictor size. The device may send the obtained AMVR parameter or an indication of the obtained AMVR parameter. The device may send the obtained AMVR parameter or an indication of the obtained AMVR parameter, for example, to a device in a bitstream. The device may send the indication of the AMVR parameter (e.g., a plurality of AMVR indices or a plurality of AMVR sets) at a slice level. The device may determine whether to enable AMVR for the video block and send an indication of whether to enable AMVR for the video block in a bitstream, for example, at a picture level or at a slice level. The AMVR parameter may include an AMVR index. The device may select the AMVR index from a plurality of AMVR indices based on at least one of the depth map of the video block, the motion map of the video block, or the average motion vector predictor size. The AMVR parameter may include an AMVR set. The device may select the AMVR set from a plurality of AMVR sets based on at least one of the depth map of the video block, the motion map of the video block, or the average motion vector predictor size.

Systems, methods, and instrumentalities are disclosed for determining a precision level of a motion vector based on the indication of motion for a video block.

A device may obtain an indication of motion associated with a video block. The device may determine a precision level of motion vector information (e.g., a motion vector difference (MVD)) associated with the video block based on the indication of motion associated with the video block. The device may decode the motion vector information associated with the video block using the precision level, for example, if the device is a decoder. The device may encode the motion vector information associated with the video block using the precision level, for example, if the device is an encoder.

The device may receive the motion vector information in video data signaled to the device, for example, if the device is a decoder. The video data may not include the precision level of the motion vector information associated with the video block. The device may determine the precision level based on the indication of motion associated with the video block.

A device may determine an adaptive motion vector resolution (AMVR) index for a video block based on the indication of motion associated with the video block. AMVR may be enabled for the video block. The device may perform AMVR by determining an AMVR index for the video block based on the indication of motion associated with the video block. The AMVR index may indicate the precision level of an MVD associated with the video block, and the precision level of the MVD may be determined based on the AMVR index.

The indication of the motion may include one or more of motion information, depth information, or a value of a motion vector predictor (MVP). An MVP associated with a video block may indicate a motion associated with an adjacent block of the video block. The motion information associated with the video block may indicate a motion intensity associated with the video block. The depth information associated with the video block may indicate a distance associated with the video block from a reference point (e.g., a distance from a virtual camera).

In example, the device may receive an MVD associated with the video block in video data signaled to the device. The video data may indicate a set of precision levels, and the device may determine the precision level of the MVD based on the set of precision levels.

A device may modify or reorder an AMVR set based on an indication of motion associated with the video block. The indication of motion may include one or more of motion information associated with the video block, depth information associated with the video block, or a value of a motion vector predictor (MVP) associated with the video block.

A device may determine an AMVR index from a set of AMVR indices for a video block. The device may obtain a set of AMVR indices and perform AMVR by selecting an AMVR index for the video block from the set of AMVR indices based on the indication of motion associated with the video block.

A device may select an AMVR set for a video block based on the indication of motion associated with the video block. The device may obtain a plurality of AMVR sets and perform AMVR by selecting an AMVR set for the video block from the plurality of AMVR sets based on the indication of motion associated with the video block. An AMVR index of the selected AMVR set may indicate the precision level of an MVD associated with the video block.

Contents, may be sent, received, or coded (e.g., encoded and/or decoded), where at least one of depth information, motion information, and/or an average motion vector predictor size is available as information along with texture information (e.g., information made of luma and/or chroma information). Compression efficiency may be improved. Bitrate may be reduced while maintaining the quality. Quality may be improved while maintaining the bitrate. The depth information, motion information, and/or an average motion vector predictor size may be coded for the (e.g., all) blocks of a picture, or for parts (e.g., only for parts) of the blocks of a picture. When depth information, motion information, and/or an average motion vector predictor size is coded in an area of the picture, it may be used to adaptively determine the precision level of a motion vector (e.g., a motion vector resolution) for a block. In some examples, the depth information, motion information, and/or an average motion vector predictor size may be used to adapt the list of allowed motion vector resolutions to test (e.g., candidate motion vector resolutions).

Joint coding of luma and depth may be performed, for example, in the "multi-view plus depth" (MVD) version of 3D video processing. Depth map (e.g., information that represents the basic geometry of the captured video scene) may be available for a (e.g., each) texture picture of a video content, for example, as a dense monochrome picture of the same resolution as the luma picture.

Figure 5:
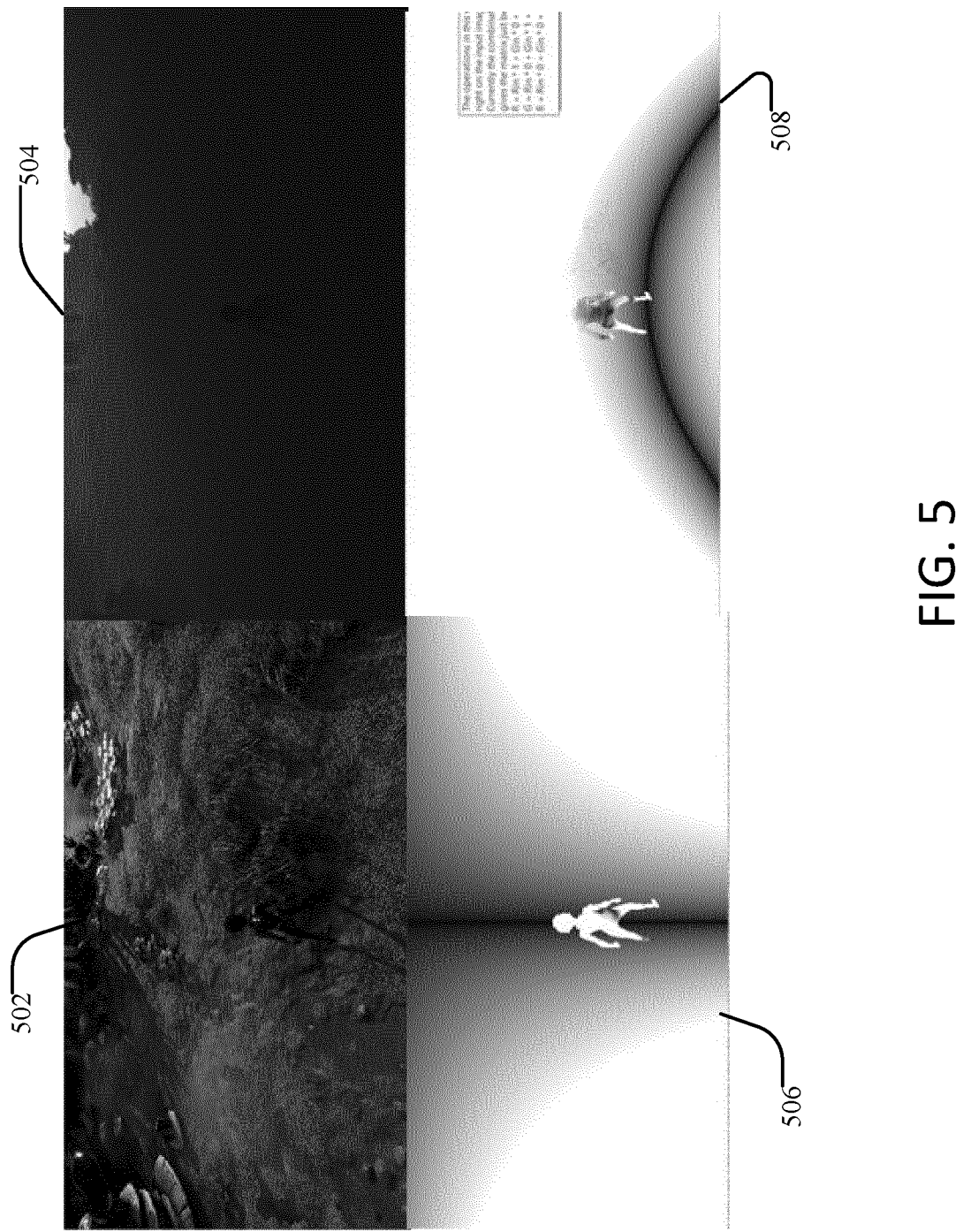
FIG. 5 illustrates an example texture frame of a video game with a corresponding depth map, horizontal motion data, and vertical motion data that may be extracted from a game engine.

A video coding system such as a cloud gaming server or a device with a light detection and ranging (LiDAR) capabilities may receive input video frames (e.g., texture frames) together with depth information (e.g., a depth map) and/or motion information, which may be correlated. FIG. 5 illustrates an example texture frame 502 of a video game with a corresponding depth map 504, horizontal motion data 506, and vertical motion data 508 that may be extracted (e.g., directly) from a game engine that is rendering the game scene. The depth map 504 may be represented by a grey-level image indicating the distance between a camera and an actual object. The depth map 504 may represent the basic geometry of a captured video scene. The depth map 504 may correspond to a texture picture of a video content and may include a dense monochrome picture of the same resolution as the luma picture. The depth map 504 may have the same resolution or a different resolution than a luma picture.

Figure 6:
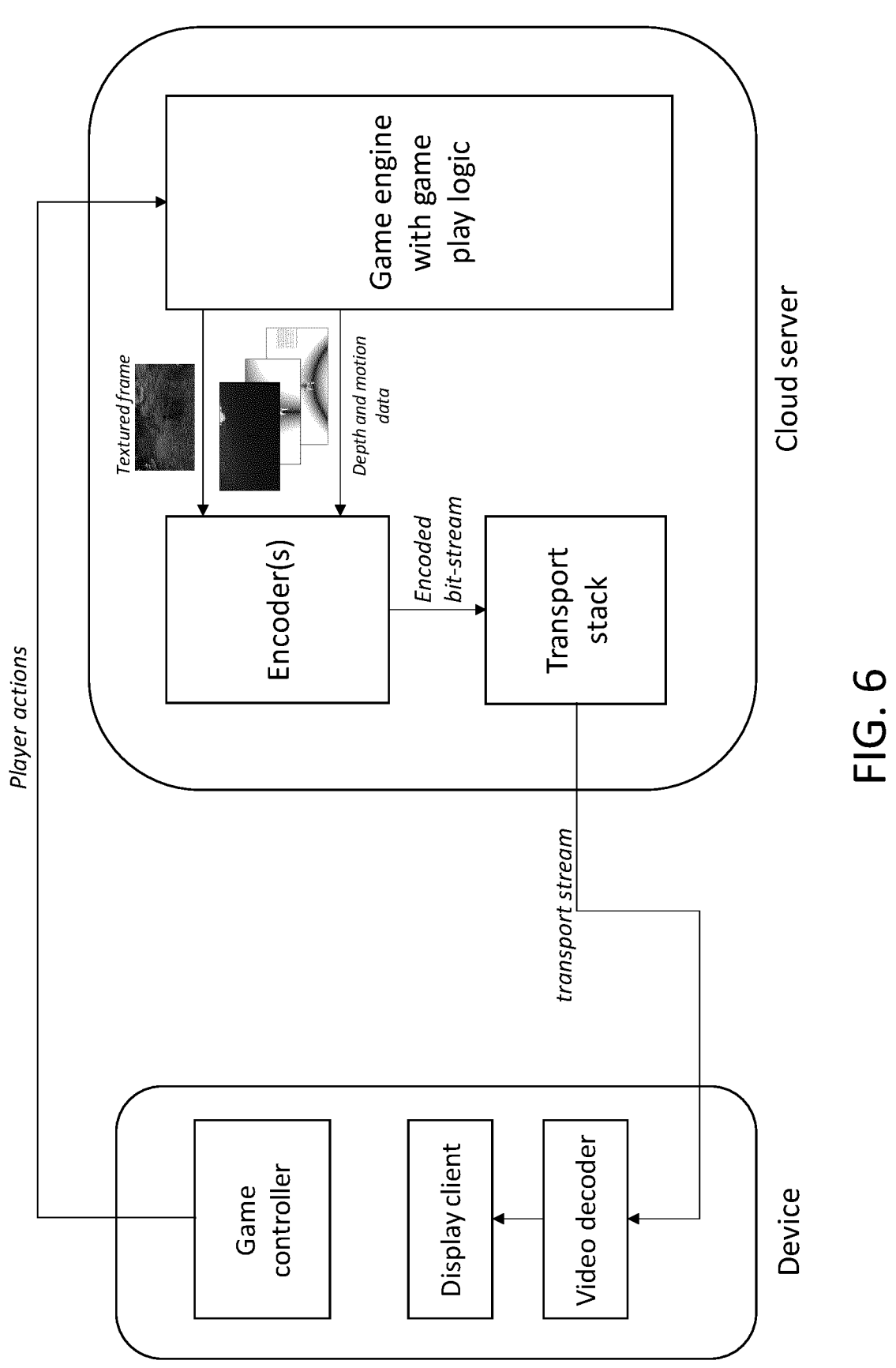
FIG. 6 illustrates an example architecture of a cloud gaming system, where a game engine may be running on a cloud server.

FIG. 6 shows an example architecture of a cloud gaming system, where a game engine may be running on a cloud server. The gaming system may render a game scene based on the player actions. The rendered game scene may be encoded into a bitstream, for example, using a video encoder. The bitstream may be encapsulated by a transport protocol and may be sent as a transport stream to the player's device. The player's device may de-encapsulate and decode the transport stream and present the decoded game scene to the player.

As illustrated in FIG. 6, additional information including one or more of a depth map, motion information, an object ID, an occlusion mask, camera parameters, etc. may be obtained from a game engine (e.g., as outputs of the game engine) and made available to the server device (e.g., an encoder of the server device) as prior information.

An inter-prediction block may be enhanced by improving the representation of motion vector, for example, by using Adaptive Motion Vector Resolution (AMVR).

A block based AMVR scheme may be used for video processing. Motion vector difference(s) (MVD(s)) between a first motion vector (e.g., a motion vector of a CU) and a second motion vector (for example, a predicted motion vector of the CU) may be signaled in units of quarter-luma-sample when an indication (for example, use_integer_mv_flag) is equal to a certain value (for example, 0) in a slice header. The value may indicate whether MVD(s) are signaled. The value may indicate whether MVD(s) are signaled in integer-sample precisions. An AMVR (e.g., a CU-level AMVR) may be used to process (e.g., encode and/or decode) CUs. Using AMVR may allow one or more MVDs of a CU to be coded in different precisions. Depending on a mode (for example, a normal AMVP mode or an affine AMVP mode) for a current CU, MVD(s) and/or one or more precision levels of the MVD(s) for the current CU may be adaptively selected. For example, a first MVD precision (for example, of quarter-luma-sample, half-luma-sample, integer-luma-sample, or four-luma-sample) may be selected for a current CU in a normal AMVP mode. A second MVD precision (for example, of quarter-luma-sample, integer-luma-sample, or 1/16 luma-sample) may be selected for a current CU in an affine AMVP mode.

In some examples, a CU-level MVD resolution indication may be signaled, for example, if the current CU has one or more non-zero MVD components. If the MVD components (for example, horizontal and vertical MVDs for reference lists L0 and L1) are zero, the MVD precision (for example, a MVD resolution) may be determined (for example, inferred) to be, for example, quarter-luma-sample.

For a CU that has one or more non-zero MVD components, an indication (for example, a first flag) may be signaled that indicates whether a quarter-luma-sample MVD precision is used for the CU. If the indication (for example, the first flag) has a value that indicates that a quarter-luma-sample MVD precision is used for the CU (for example, 0), a quarter-luma-sample MVD precision may be used for the CU and further signaling may be skipped. If the indication (for example, the first flag) has a value that indicates that a quarter-luma-sample MVD precision is not used for the CU (for example, 1), an indication (for example, a second flag) may be signaled to indicate whether a half-luma-sample MVD precision is used for the AMVP CU. If the indication (for example, the second flag) indicating that a half-luma-sample MVD precision is used for the AMVP CU, a 6-tap interpolation filter may be used (for example, instead of an 8-tap interpolation filter that may be a default) for the half-luma sample position. If the indication (for example, the second flag) indicates that a half-luma-sample MVD precision is not used for the AMVP CU, an indication (for example, a third flag) may be signaled to indicate whether a four-luma-sample or integer-luma-sample MVD precision is used for the AMVP CU.

For an affine AMVP CU, an indication (for example, a different flag) may be used to indicate whether an integer-luma-sample or 1/16 luma-sample MVD precision is used. One or more motion vector predictors for the CU may be rounded to the same precision as that of the MVD (for example, before being added to the MVD), for example, such that the reconstructed MV has the intended precision (for example, quarter-luma-sample, half-luma-sample, integer-luma-sample, or four-luma-sample). The motion vector predictors may be rounded towards zero (for example, a negative motion vector may be rounded toward a positive infinity and a positive motion vector predictor may be rounded toward a negative infinity).

A video processing device may determine a motion vector precision (for example, a motion vector resolution) for the current CU, for example, using an RD check. The video processing device may include an encoder. RD checks for one or more MVD precisions (for example, other than a quarter-luma-sample MVD precision) may be skipped in some examples and invoked in other examples (for example, conditionally). For a normal AMVP mode, an RD cost of a quarter-luma-sample MVD precision and/or an integer-luma-sample MV precision may be obtained (for example, computed). The RD cost of the integer-luma-sample MVD precision may be compared to that of the quarter-luma-sample MVD precision, for example, to determine whether to further check the RD cost of a four-luma-sample MVD precision. If the RD cost for quarter-luma-sample MVD precision is smaller than that of the integer-luma-sample MVD precision (for example, by a certain value), an RD check for four-luma-sample MVD precision may be skipped. For example, the RD check for the four-luma-sample MVD precision may be skipped if a ratio of the RD cost of the inter-luma-sample MVD prediction to the RD cost of the quarter-luma-sample MVD precision is in the range of approximately 1.04-1.1 (for example, 1.06). A check of a half-luma-sample MVD precision may be skipped if the RD cost of integer-luma-sample MVD precision is (for example, significantly) larger than the best RD cost of previously-tested MVD precisions. For example, the check of the half-luma-sample MVD precision may be skipped if a ratio of the RD cost of the integer-luma sample to the best RD cost is in the range of approximately 1.2-1.3 (for example, 1.25). For an affine AMVP mode, if an affine inter mode is not selected after checking rate-distortion costs of an affine merge/skip mode, a merge/skip mode, a quarter-luma-sample MVD precision AMVP mode and/or a quarter-luma-sample MVD precision affine AMVP mode, 1/16 luma-sample MV precision and/or 1-pel MV precision affine inter modes may not be checked. One or more affine parameters obtained in a quarter-luma-sample MV precision affine inter mode may be used as a starting search point in 1/16 luma-sample and/or quarter-luma-sample MV precision affine inter modes.

Increasing the resolution of motion vector may improve the prediction accuracy and/or reduce the motion vector difference signaling cost. Higher resolution motion vectors may require more bits to encode and/or decode. In some examples, a trade-off between the prediction accuracy and motion vector resolution may be taken.

In examples, an integer-pel motion vector resolution may be employed. A half-pel motion vector resolution may be used in some examples. A quarter-pel motion vector resolution may be employed, for example, to achieve better compression gains compared to an integer-pel motion vector resolution and/or a half-pel motion vector resolution. $1/8^{th}$-pel resolution may be used. In some examples, increasing the resolution to $1/8^{th}$-pel may lead to little coding gain due to increase in the signaling cost of a higher resolution MVD.

In examples, not all the blocks in a video sequence require higher resolution(s) to represent the motion vectors. Prediction error(s) may be linearly correlated to the texture complexity in a scene, in some examples. For the same level of mismatch between the original block and the predicted block, the sum of absolute differences (SAD) score for a complex textured block may be higher compared to the SAD score for a simple textured block, in some examples.

AMVR may be used, for example, to reduce the MVD signaling cost. AMVR may be applied (e.g., only applied to) the regular AMVP scheme and/or to the affine AMVP scheme. Multiple modes (e.g., the regular AMVP and the regular affine AMVP) may require signaling of an MVD that is obtained after subtracting the motion vector (MV) from the motion vector predictor (MVP) as shown in Equation 1.1 and Equation 1.2.

$$MVD_x = MV_x - MVP_x \qquad (1.1)$$

$$MVD_y = MV_y - MVP_y \qquad (1.2)$$

A 1/2-pel, 1-pel and 4-pel accuracy may be allowed at a CU level (e.g., instead of only allowing $1/4^{th}$-pel accuracy to signal an MVD). A precision level of an MVD (e.g., an MVD precision) may be adaptively selected per CU, and an index may be signaled in the bitstream. An MVD may be encoded and/or decoded using the MVD precision. If an MVD is 0, an AMVR index may not be signaled and the MV resolution may be inferred as $1/4^{th}$-pel. During the construction of predictors (e.g., in case of AMVP), the predictors may be rounded to the same accuracy as the MVD. Table 1 shows an example for AMVR index signaling. In one or more examples herein, MVD precision and MVD resolution may be used interchangeably. Table 1 shows an example AMVR index signaling.

TABLE 1

| An example AMVR index signaling | | | |
|---|---|---|---|
| Regular AMVP | Bits | Affine AMVP | Bits |
| 1/4-pel | 0 | 1/4-pel | 0 |
| 1/2-pel | 10 | 1-pel | 10 |
| 1-pel | 110 | 1/16-pel | 11 |
| 4-pel | 111 | | |

An AMVR mode with different precisions may be tested in an RD-fashion with some encoder speed-ups inside an AMVP mode and an affine AMVP mode. The resolutions that are tested are illustrated in Table 2. For example, in affine AMVP, a 1/16-pel MV precision may be tested in place of 1/2-pel and 4-pel.

An AMVR scheme may be extended to an intra block copy (IBC) scheme where an MV is replaced by a displacement vector. A displacement vector resolution of 1-pel or 4-pel may be tested in case of IBC. Table 2 shows the MV precision used for coding the vectors in different modes.

TABLE 2

| Example AMVR precisions for different AMVP modes | | | |
|---|---|---|---|
| | Regular AMVP | Affine AMVP | IBC AMVP |
| AMVR precision | 1/4-pel | 1/4-pel | |
| | 1/2-pel | 1-pel | |
| | 1-pel | 1/16-pel | 1-pel |
| | 4-pel | | 4-pel |

Figure 7:
FIG. 7 illustrates an example game scene with foreground and background.

A gaming scene may include a background scene and several foreground objects that can further be classified into moving objects or stationary objects. For example, a background scene may be usually static and subjectively less important. The background may contain heavy texture (e.g., rocks, mountains, grass etc.). The heavy texture may be difficult to encode and/or decode. FIG. 7 illustrates an example game scene with a foreground and a background.

Adaptive motion resolution (e.g., a frame-level adaptation of the resolution, a block level adaptation, etc.) may be used for encoding/decoding a game scene. In some examples, while a frame-level adaptation of resolution may be less costly in terms of signaling, it may or may not adapt to local spatiotemporal characteristic variations in a frame.

Figure 8:
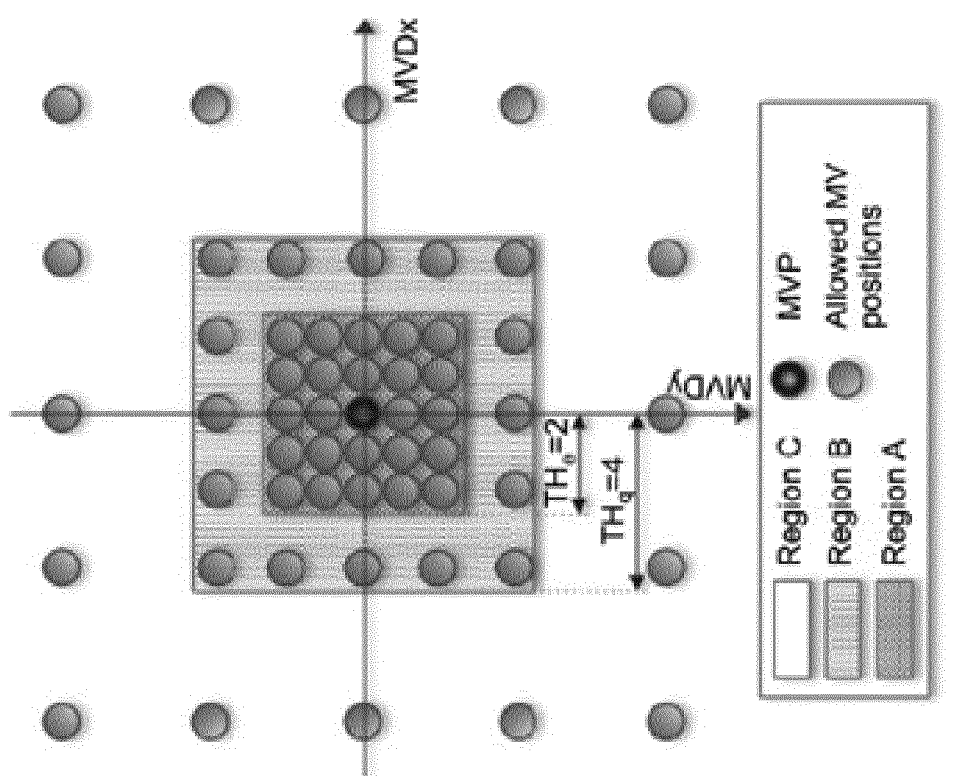
FIG. 8 illustrates an example PMVR scheme.

A progressive MV resolution (PMVR) scheme may be used, where finer resolutions may be employed near to the MVP, and coarser resolutions may be used as an MV search moves away from the MVP. In examples, the MV resolution(s) may progressively decrease as the MV(s) goes away from the MV predictor based on pre-decided thresholds. FIG. 8 illustrates an example PMVR scheme. In FIG. 8, a quarter-pel threshold THe=2 and an one-eighth pel threshold THq=4 may define MVP regions. In FIG. 8, region A refers to 1/8-pel, region B refers to 1/4-pel, and region C refers to 1/2-pel.

In an example PMVR scheme, the thresholds (e.g., ones used in the original PMVR) may be adapted based on PU size(s). For example, larger PU size(s) may use finer resolution(s), and smaller PU size(s) may use coarser resolution(s). Threshold(s) may be further adapted based on the spatial complexity of a PU. For example, finer MV resolution(s) may be used for PU(s) with higher complexity, and coarser MV resolution(s) may be used for PU(s) with lower complexity. In some examples, the current PU may not be causal and/or may not be available at the decoder side. This complexity may be derived, for example, by calculating gradient(s) on block(s) obtained from a reference frame.

In examples, a PMVR scheme may provide good coding gains. In some examples, a PMVR scheme may lead to higher encoder and decoder complexity. For example, a PMVR scheme may be used to achieve 1.2% coding gain (e.g., on top of HEVC) with 17% more complexity added at the encoder side and the decoder side. In examples, much of the complexity may come from the computation of gradient(s) using Sobel filter(s). In some examples, motion estimation algorithm(s) may be improved by performing the motion search along MVPs (e.g., both two MVPs available in an AMVP mode), which may further lead to an increase in complexity with a marginal coding gain.

In some approaches, the distance or depth of an object in a scene from the camera may be considered, for example, based on motion parallax. Based on motion parallax, for the same degree of a camera motion, object(s) placed far from the camera may move less compared to object(s) placed close to the camera. In examples, a finer precision may be used for slow-moving region(s). A coarser precision may be used for fast-moving region(s).

In examples, motion information (e.g., motion data from a game engine) may be used to determine the level of activities between different frames and/or used to determine the level of activities between different regions (e.g., a CU or CTU) within a given frame. Based on the level of activities, motion vector resolution(s) may be adaptively determined (e.g., adaptively chosen). A lower resolution may be used for a higher level of activity (e.g., the higher level of activity may require the lower resolution). A higher resolution may be used for a lower level of activity (e.g., a lower level of activity may require the higher resolution). In examples, a quality loss around the area(s) where fast motion is happening may be less perceptible than a quality loss around area(s) where less motion is happening. In the region(s) with a high motion, predictor(s) may be less accurate on an average (e.g., which may cause an MVP and an MV to be different), and, for example, a coarser resolution (e.g., the coarser resolution used by the PMVR) may be used. In region(s) with slow or no motion (e.g., zero motion), an MVP and an MV may be close to each other, and, for example, a finer resolution may be used.

When depth information (e.g., a depth map) and/or motion information (e.g., shown in FIG. 5) is available, depth information and/or motion information may be used to determine the MV resolution, for example, by an encoder or by a decoder. The information (e.g., information signal such as depth information and/or motion information) may indicate or provide the distance of a block from the camera and/or the motion characteristic of an object. The information may be employed, for example, for encoder improvement and/or coding gain improvement.

Encoder improvement and/or decoder improvement may be achieved using depth information (e.g., depth map) and/or motion information.

In some examples, depth information may be used to switch (e.g., adaptively switch) from finer resolution(s) to coarser resolution(s), for example, using a threshold-based method. An AMVR index may be signaled in one or more of these examples. Encoder run time may be reduced as less RD checks are made to obtain a certain AMVR index (e.g., the best AMVR index).

In some examples, motion information may be used to choose (e.g., adaptively choose) MV resolution(s) based on threshold(s). A resolution may be adapted to a level of activities in a (e.g., each) CU. In examples, a precision level of motion vector information may be determined based on motion information. The motion information may indicate a level of activities, for example, associated with a video block.

In some examples, motion information obtained from a game engine may be used to improve a PMVR scheme. Encoder run time may be reduced, for example, by skipping the computationally intensive MV search (e.g., related to motion estimation).

A coding gain improvement (e.g., at the decoder side) may be achieved using depth map and/or motion information in one or more examples herein.

In examples, signaling the information related to AMVR (e.g., AMVR index) may be skipped, and the information related to AMVR may be deduced at the decoder side. For example, a decoder may analyze the depth information and/or motion information (e.g., as signaled) to deduce the AMVR index for a (e.g., each) block (e.g., a CU). The AMVR index may indicate the precision level of motion vector information (e.g., an MVD). The motion vector information may be encoded and/or decoded using the precision level.

In some examples, depth information and/or motion information may be used to re-order an AMVR index table. Signaling may be improved.

In one or more examples herein, depth information (e.g., depth map) and/or motion information (e.g., motion map) may be used to improve an AMVR scheme. The MV resolution may be deduced based on depth information and/or motion information, which may be used, for example, to accelerate the encoding time and/or increase the coding gain by reducing signaling overhead.

A method, process, apparatus, medium storing instructions, medium storing data, or signal according to, but not limited to one or more of the following may be described herein: determining a precision level (e.g., an AMVR index such as the best AMVR index) by using one or more of depth map(s), motion map(s), and/or MVP(s) (e.g., MVP size(s)), for example, to speed-up video processing (e.g., by an encoder or encoder-only) and/or to reduce signaling; determining a set of precision levels (e.g., an AMVR set such as the best AMVR set) by using one or more of depth map(s), motion map(s), and/or MVP(s) (e.g., MVP size(s)), for example, to speed-up video processing (e.g., by an encoder) and/or to reduce signaling cost (e.g., by pruning AMVR set per CU), and/or to reduce signaling (e.g., by re-ordering AMVR set per CU); signaling an AMVR set at a slice level (e.g., based on depth map(s) and/or motion map(s)); signaling an AMVR enabled flag in a slice header and/or a picture header (e.g., based on depth map(s) and/or motion map(s)); speed-up a PMVR scheme using motion map(s).

Depth information (e.g., a depth map) may indicate an object's distance from the camera. Motion information may be used to determine the motion characteristics of a given object or a region in a scene. Using depth information and/or motion information may lead to an easier detection of the best precision of motion vector information (e.g., an MV precision level) for a given coding unit (CU), for example, to perform an MV search and/or encoding of an MVD.

Depth information may include a depth map, which may be represented by a grey-level image indicating the distance between a camera and an actual object. The depth map may represent the basic geometry of a captured video scene. The depth map may correspond to a texture picture of a video content and may include a dense monochrome picture of the same resolution as the luma picture. The depth map may have the same or different resolution than a luma picture. The depth information may be of a limited range such as a foreground, a middle ground, and a background. This information may be made available at the client (e.g., decoder) side, for example, if the information is encoded in a bit-stream or if additional information (e.g., flags, etc.) is derived and coded (e.g., per block) with a picture. The depth information may be inferred (e.g., if not otherwise available) from the motion information, for example, if camera intrinsic and/or extrinsic parameters are known. The inference may be performed, for example, based on epipolar geometry. The motion information may be inferred from previously reconstructed blocks in the current frame or from previously reconstructed (e.g., reference) frames (e.g., using temporal motion vector prediction or decoder side motion estimation). In the examples provided herein, it is assumed that additional information about a picture such as depth and/or motion information of the picture may be available at the picture decoding stage, or that reduced information may be derived per block.

An MVP list may be constructed, e.g., normatively. The MVP list may be constructed from neighboring blocks of a same frame (e.g., the current frame including the current block) or from co-located blocks in a reference frame. In some examples, MVs (e.g., MVs used in the past) may be stored in a first in first out (FIFO) buffer (e.g., used as history-based motion vector predictors (HMVP) and/or may be used when constructing the MVP list. An MVP may indicate a motion of a neighboring block.

An MVP list may contain multiple MVPs (e.g., for a regular AMVP and an affine AMVP mode, an MVP list may include 2 predictors). An average MVP size may be determined based on the (e.g., some or all) of the MVPs in the MVP list, for example, using the absolute magnitudes of the MVPs in the MVP list. As an example, for a MVP list having two predictors, an average MVP size may refer to the average absolute magnitude of both MVPs inside the list, as shown in Equations 3.1-3.3, where $N_P=2$ when MVP list contains 2 MVPs.

$$MVP_{avg_x} = \frac{1}{N_P}\sum_i MVP_{i_x} \qquad (3.1)$$

$$MVP_{avg_y} = \frac{1}{N_P}\sum_i MVP_{i_y} \qquad (3.2)$$

$$MVP_{avg} = \left(MVP_{avg_x}, MVP_{avg_y}\right) \qquad (3.3)$$

Information related to MVP(s) (e.g., MVP size(s) or an average MVP size) may be available on the encoder side and/or the decoder side. A device (e.g., a decoder) may construct an MVP list based on various normative rules. MVP(s) or an MVP list may be constructed for various inter prediction modes. The device may use an MVP list to calculate an average MVP size (MV $P_{avg}$) and determine a precision level of MV information (e.g., an AMVR precision) based on the average MVP size. The device may determine a precision level of MV information based on a variance between MVPs (e.g., two or more MVPs in the MVP list) and/or a size of a base MV in the MVP list.

In some examples, a rate distortion (RD) search may be performed with the possible MV resolutions (e.g., all MV resolution candidates). A resolution (e.g., the best resolution) with a minimum RD cost may be selected, and an index for the selected resolution may be signaled in the bitstream, for example, as per Table 1. Features from depth information (e.g., a depth map) and/or motion information (e.g., a motion map) may be used to determine a certain AMVR index (e.g., directly determine the best AMVR index) and/or a certain AMVR set (e.g., directly determine a new re-ordered or modified (e.g., pruned) AMVR set). An encoder speed and/or bitrate saving may be improved. An MV resolution may indicate a precision level of MV information (e.g., an MV, an MVD, etc.)

Figure 9:
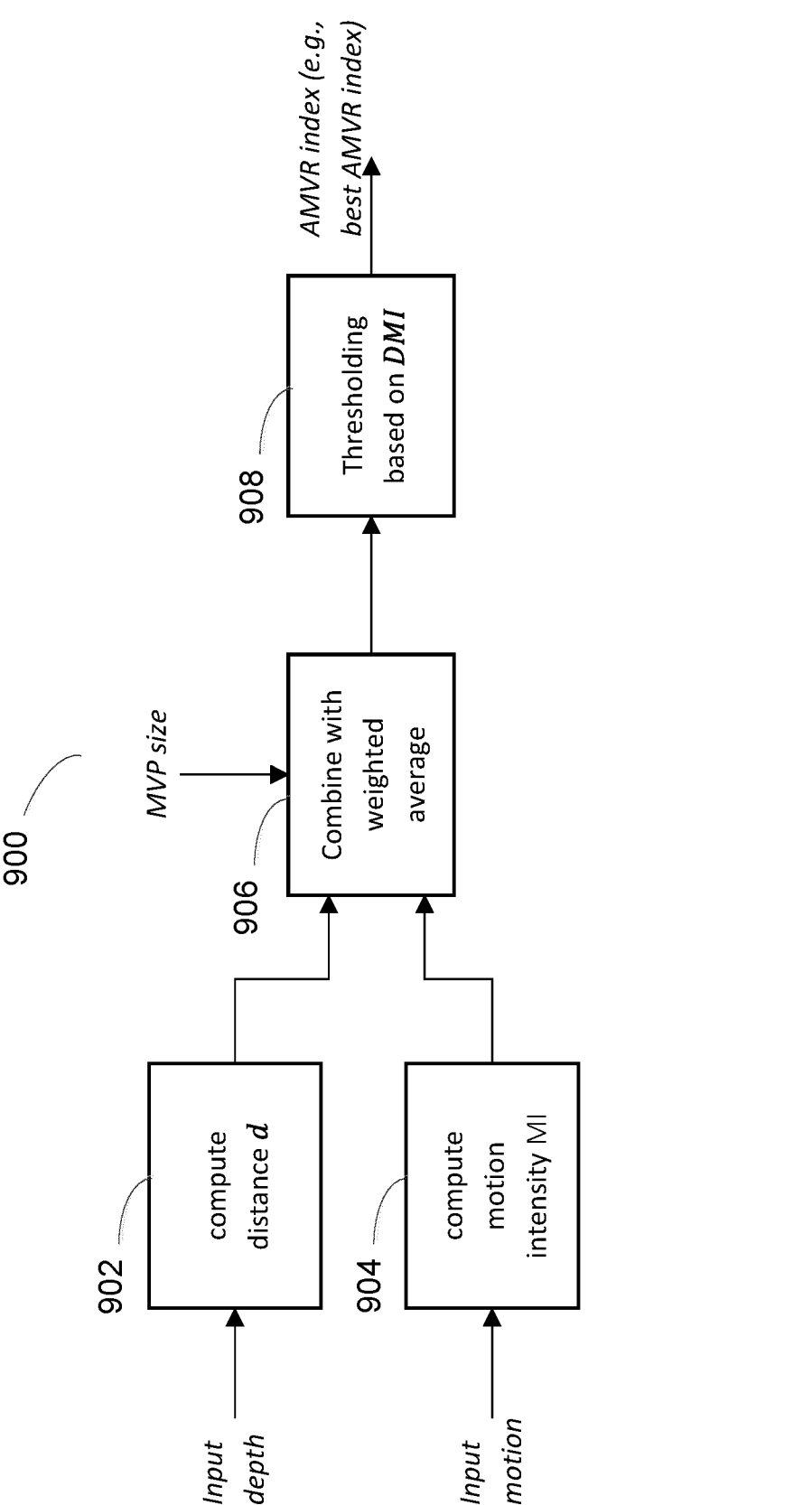
FIG. 9 illustrates an example 900 for determining an AMVR index (e.g., the best AMVR index).

An AMVR index (e.g., the best AMVR index) may be determined, for example, based on at least one of depth information (e.g., a depth map), motion information, and/or an MVP (e.g., an average MVP size). In an example, a depth map, a motion map, and/or an average MVP size may be used to determine the best MV resolution for a given CU block. FIG. 9 illustrates an example 900 for determining an AMVR index (e.g., the best AMVR index).

An indication of motion may include depth information. Depth information may indicate a distance, for example, from a virtual camera. In examples, a distance (e.g., an average distance) from a reference point (e.g., a camera such as a virtual camera) may be determined, for example, based on one or more of a bit-depth associated with a block, the number of pixels in the block, and a depth value at a (e.g., each) position in the block. For example, at 902 of FIG. 9, a depth map corresponding to the current block may be used to compute an average distance d using Equation 4.1.

$$d = \frac{1}{2^{bd} * N_B}\sum_{(x,y)\in B} D(x, y) \qquad (4.1)$$

where, bd is defined as bit-depth, $N_B$ is the number of pixels in a block B and D(x, y) is the depth value at (x, y) position inside a block B.

An indication of motion may include motion information. The motion information may indicate a motion intensity. A motion intensity may be determined based on, for example, a motion map. In examples, a motion intensity (e.g., an average motion intensity) of a block may be determined, for example, based on one or more of the number of pixels in a block, a motion vector in a horizontal direction of the block (e.g., an average motion vector in the horizontal direction of the block), a motion vector in a vertical direction of the block (e.g., an average motion vector in the vertical direction of the block). For example, at 904 of FIG. 9, a motion map corresponding to the current block may be used to compute an average motion intensity MI using Equation 4.2.

$$MI = \frac{1}{N}\left(\left|MV_{avg_x}\right| + \left|MV_{avg_y}\right|\right) \qquad (4.2)$$

where, N is the number of pixels in a block, $MV_{avg_x}$ and $MV_{avg_y}$ are average motion vectors in x and y-direction per block.

An indication of motion may include an MVP. An MVP may be a motion vector or a motion field associated with a block adjacent to a current block. An MVP may indicate a motion associated with a block adjacent to a current block. The motion associated with the block adjacent to the current block may indicate a motion associated with the current block. In examples, an MVP (e.g., the average of MVPs) may be used to determine a precision level of MV information for a block. For example, at 906 of FIG. 9, the average size of MVPs (MVP$_{size}$) may be used as an input feature when determining the best MV resolution of a given block.

An indication of motion (e.g., as indicated by a level of activity) may be determined, for example, based on one or more of a distance, a motion intensity, or an MVP. A respective weight may be given to a distance, a motion intensity, or an MVP. For example, the above features may be combined using weighted average as shown in Equation 4.3.

$$DMI = \alpha * d + \beta * MI + \gamma * MVP_{size} \qquad (4.3)$$

Where one or more of weights $\alpha$, $\beta$ and $\gamma$ may be determined (e.g., empirically) based on a training set (e.g., a large training set). Here, DMI is referred as the depth motion activity index (e.g., DMI may be normalized to a value between 0 and 1). For example, an algorithm (e.g., a machine learning algorithm) may be used to determine one or more of the weights. In examples, training data for the algorithm may include a training set of N coding blocks with the associated depth d, motion intensity MI, an MVP list and the best AMVR index chosen by the encoder at encoding stage. An algorithm that minimizes the cost of predicting the correct AMVR index by setting various values of weights may be used or designed. The output of this algorithm may be an optimized set of weights.

The indication of motion may be compared with one or more threshold values. For example, at 908 of FIG. 9, a DMI value may be compared to a set of thresholds that represent the best MV resolution. The thresholds may be (e.g., empirically) calculated from training data (e.g., a large set of training data). For example, an algorithm (e.g., a machine learning algorithm) may be used to determine one or more of the thresholds. For example, training data for the algorithm may include a training set of N coding blocks with the associated depth d, motion intensity MI, an MVP list and the best AMVR index chosen by the encoder at encoding stage. An algorithm that minimizes the cost of predicting the correct AMVR index by setting various values of a threshold may be used or designed. The output of this algorithm may be an optimized set of thresholds. In another example, an algorithm that jointly optimize the weights $\alpha$, $\beta$ and $\gamma$ and a set of thresholds may be used or designed.

A device may modify or reorder a set of precision levels, for example, based on one or more of depth information, motion information, or an MVP. In some examples, a device may modify a set of precision levels using a threshold. In an example case, if DMI<T, where T is a threshold then the AMVR set may be modified as follows: modified AMVR set A1=$\{1/4, 1/2\}$-pel. If DMI>T, then the AMVR set may be modified as follows: modified AMVR set A2=$\{1, 4\}$-pel.

Figure 10:
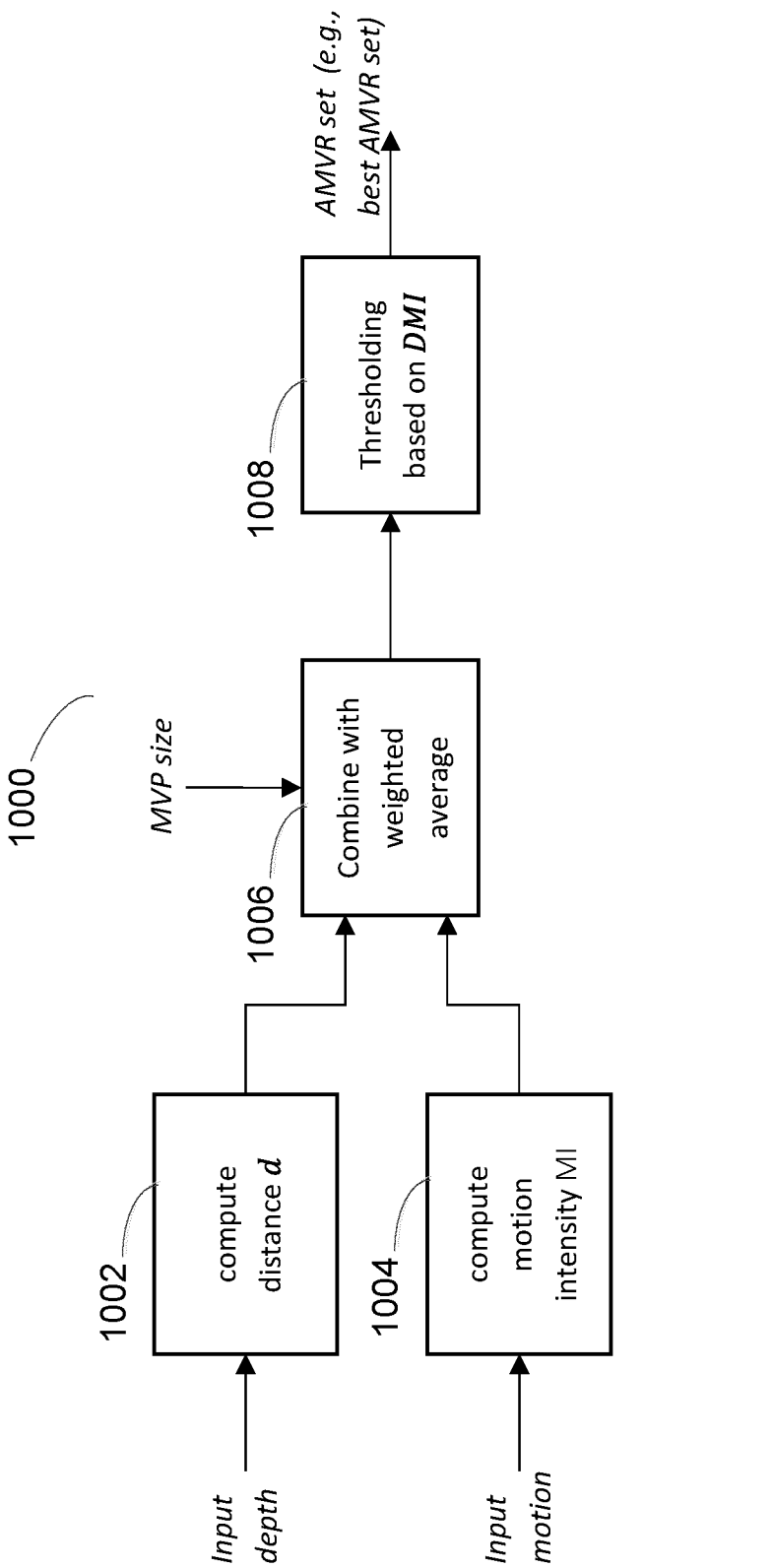
FIG. 10 illustrates an example 1000 for determining an AMVR set (e.g., the best AMVR set).
Figure 11:
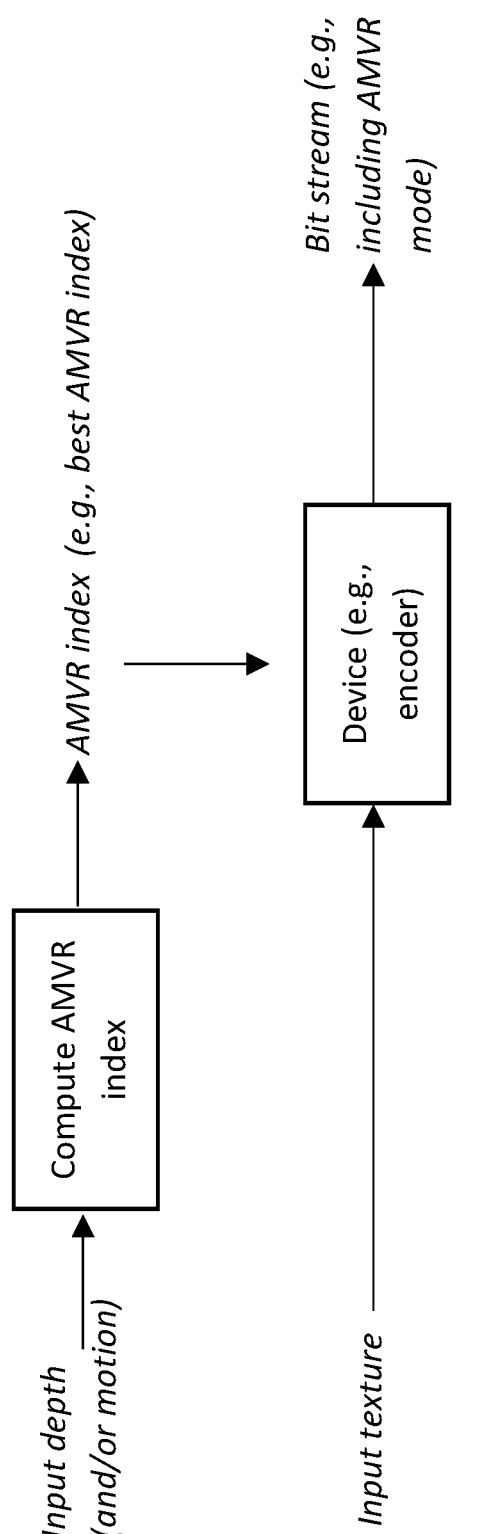
FIG. 11 illustrates an example encoder speed up, for example, using depth, motion information, etc.

FIG. 10 illustrates an example 1000 for determining an AMVR set (e.g., the best AMVR set). One or more example approaches herein may be used to determine the AMVR set. At 1002 of FIG. 10, a depth map corresponding to the current block may be used to compute an average distance d, for example, using Equation 4.1. At 1004 of FIG. 10, a motion map corresponding to the current block may be used to compute an average motion intensity MI, for example, using Equation 4.2. At 1006 of FIG. 10, the average size of MVPs (MVP$_{size}$) may be used as an input feature when determining the best MV resolution of a given block. The above features may be combined using weighted average, for example, as shown in Equation 4.3. At 1008 of FIG. 10, DMI value may be compared to a set of thresholds that represent the best MV resolution.

An indication of motion may include depth information, motion information, or an MVP. One or more examples herein may use the value(s) of weighting factor(s) as described herein. In some examples, only motion map may be used to determine the best MV resolution (e.g., when $\alpha$=0 and $\gamma$=0). In some examples, only depth map may be used to determine the best MV resolution (e.g., when $\beta$=0 and $\gamma$=0). In some examples, only MVPs (e.g., from an MVP list) may be used to determine the MV resolution (e.g., when $\alpha$=0 and $\beta$=0).

An AMVR set (e.g., the best AMVR set) may be determined. FIG. 10 illustrates an example for determining an AMVR set (e.g., the best AMVR set). As shown in FIG. 10, one or more of 1002-1010 may be used to determine the AMVR set (e.g., instead of a single index for a given coding unit (CU)). This AMVR set may be modified, and, for example, this AMVR set may be defined by a reduced set of motion vector resolutions adapted for a given block or may be a re-ordered version of the AMVR set originally used, adapted to a given block. An example of a reduced AMVR sets and re-ordered AMVR sets may be shown in Table 3 and 4, respectively.

TABLE 3

| Example reduced AMVR sets | |
|---|---|
| Index | Reduced AMVR set |
| 1 | {1/4-pel, 1/2-pel, 1-pel} |
| 2 | {1/2-pel, 1-pel, 4-pel} |
| 3 | {1-pel, 4-pel} |
| . . . | . . . |

TABLE 4

| Example re-ordered AMVR sets | |
|---|---|
| Index | Re-ordered AMVR set |
| 1 | {4-pel, 1-pel, 1/4-pel, 1/2-pel} |
| 2 | {1-pel, 1/2-pel, 1/4-pel, 4-pel} |
| 3 | {1-pel, 4-pel, 1/2-pel, 1/4-pel} |
| . . . | . . . |

Video processing (e.g., by an encoder) may be accelerated. The example presented in FIG. 9 may be used to reduce the RD search (e.g., RD search of the encoder) and/or reduce the overall encoding time. In the example shown in FIG. 11, depth information (e.g., a depth map) and motion information (e.g., a motion map) may be available to a device (e.g., the encoder) along with a block of texture information (e.g., a texture block). The device may determine a certain AMVR index (e.g., the best AMVR index) using the input depth information and/or motion information. The device may avoid testing all possible AMVR modes (e.g., 4 AMVR modes in certain codecs such as WC). The device may encode or decode the texture information using the AMVR index and include the encoded or decoded information in video data. The example in FIG. 11 may enable encoder speed up, for example, using depth information, motion information, etc. Depth information (e.g., a depth map) and/or motion information (e.g., a motion map) may be available to an encoder and a decoder. Signaling may be reduced.

Figure 12:
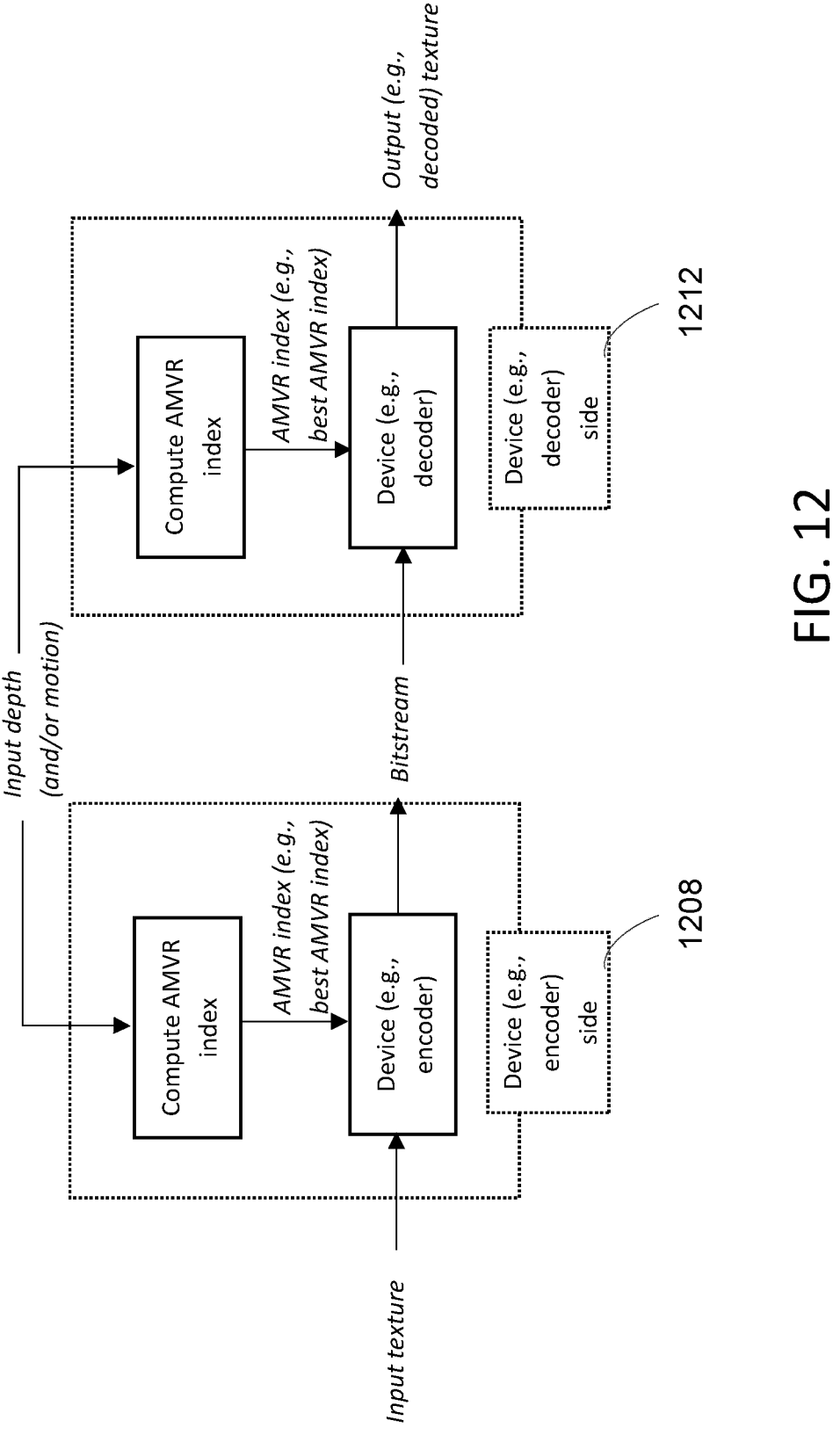
FIG. 12 illustrates an example AMVR index derivation at encoder and decoder side (e.g., based on a depth map, a motion map, etc.).

FIG. 12 illustrates an example of AMVR index derivation at a sender side and a receiver side (e.g., based on one or more of a depth map, a motion map, MVP(s), etc.). The example shown in FIG. 12 may be normatively implemented. The example shown in FIG. 12 may be applicable to an encoder and a decoder. In the example shown in FIG. 12, the sender may include an encoder. The sender side 1208 (e.g., an encoder side) may have depth information and/or motion information available. The receiver may include a decoder. The receiver side 1212 (e.g., a decoder side) may have depth information and/or motion information available. The sender side 1208 may receive texture information (e.g., input texture). The texture information may be encoded and included in bitstream. The receiver side 1212 may receive the bitstream and decode the texture information to generate the decoded texture. One or more of the depth information (e.g., a depth map), the motion information (e.g., a motion map), or the value determined from MVPs (e.g., an MVP list) may be used, at the sender side 1208 to deduce the best MV resolution index, for example, if the depth or motion map is available to both encoder and decoder. The depth information (e.g., a depth map) or the motion information (e.g., a motion map) may be used, at the receiver side 1212, to deduce the best MV resolution index, for example, if the depth or motion map is available to both encoder and decoder. In examples, an encoder and a decoder may perform the same process for finding the best MV resolution for a given block. An AMVR index may not need to be signaled, for example, to a decoder. A device (e.g., a decoder) may deduce the AMVR index based on depth map and/or motion map analysis (e.g., in the same fashion as the example shown in FIG. 9). Signaling overhead may be reduced, and therefore providing bitrate saving.

Figure 13:
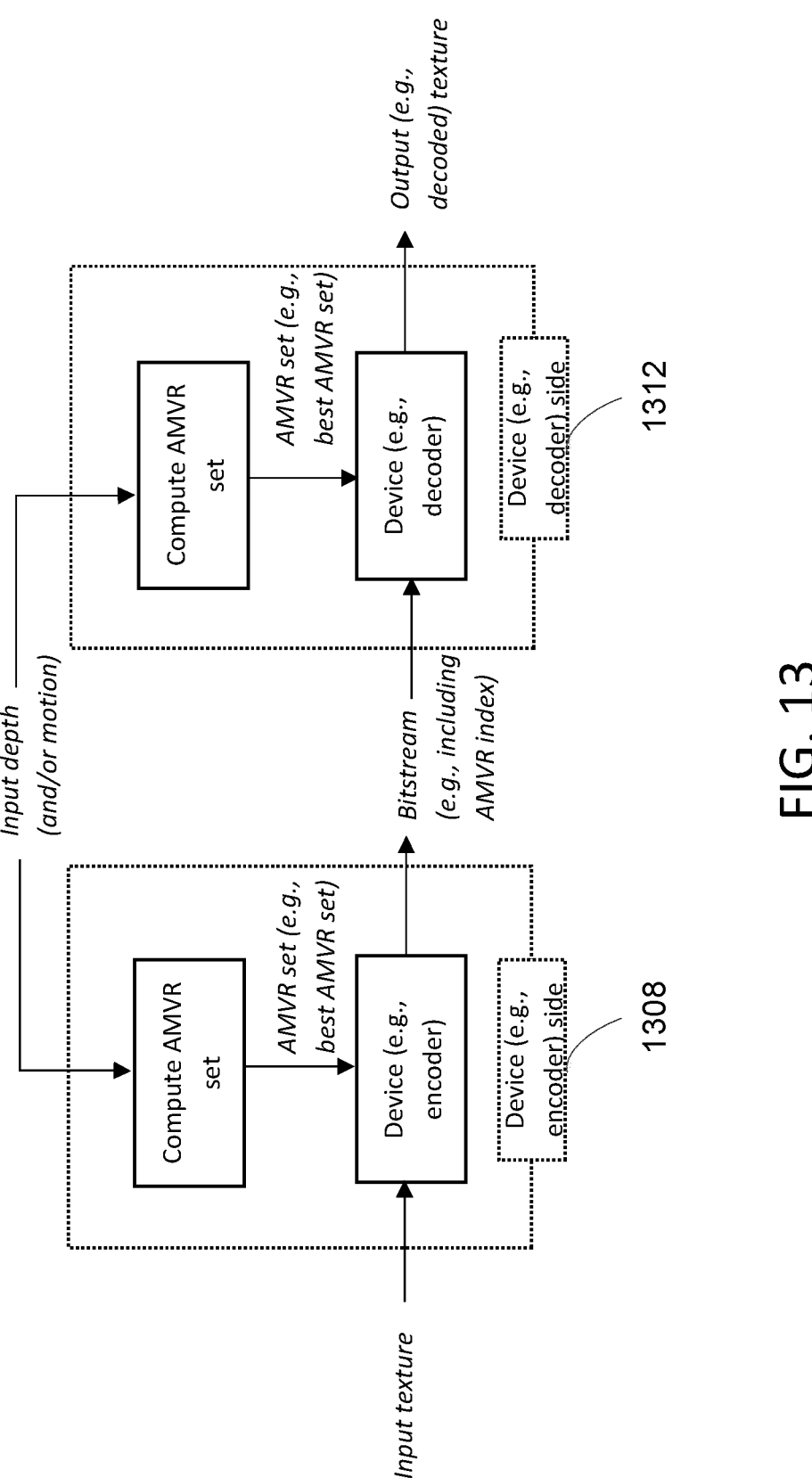
FIG. 13 illustrates an example for deriving a certain AMVR set (e.g., the best AMVR set) at an encoder and a decoder side, for example, based on a depth map, a motion map, etc.

An AMVR set may be adapted or flexibly used. FIG. 13 illustrates an example for deriving a certain AMVR set (e.g., the best AMVR set) at a sender side and a receiver side (e.g., based on one or more of a depth map, a motion map, MVP(s), etc.). The example shown in FIG. 13 may be applicable to an encoder and a decoder. In the example shown in FIG. 13, the sender may include an encoder. The sender side 1308 (e.g., an encoder side) may have depth information and/or motion information available. The receiver may include a decoder. The receiver side 1312 (e.g., a decoder side) may have depth information and/or motion information available. The sender side 1308 may receive texture information (e.g., input texture). The texture information may be encoded and included in bitstream. The receiver side 1312 may receive the bitstream and decode the texture information to generate the decoded texture. The example in FIG. 13 may be considered an extension of AMVR mode where different AMVR sets are allowed for different CUs (e.g., AMVR sets that are beyond the usual set shown in Table 2). Depending on one or more of depth information (e.g., a depth map), motion information, or MVP(s) (e.g., an average motion vector predictor size), a best AMVR set may be chosen, for example, amongst a dictionary of sets already defined on the encoder side and/or decoder side. In FIG. 13 (similar to the example shown in FIG. 10), the depth information and/or motion information may be available on the encoder side and/or the decoder side. In examples, the same process of finding the best AMVR set may be performed on the encoder side and on the decoder side. An index to determine the best AMVR set may not need to be coded (e.g., encoded or decoded). An AMVR index may be signaled and/or determined using RD search (e.g., the RD search method employed in VVC).

In some examples where an AMVR set is a pruned version of an original AMVR set, the example shown in FIG. 13 may help encoder speed-up while reducing the overall indexing cost.

In some examples where an AMVR set is a re-ordered version of an original AMVR set, the example shown in FIG. 13 may lead to bitrate saving, for example, because, with re-ordering, the most probable AMVR index is placed first. Using variable length coding to signal AMVR may lead to cost savings.

A set of precision levels (e.g., an AMVR set) may be signaled at a slice level (e.g., in a slice header). For example, a syntax may be used to signal an AMVR set at the slice level. This AMVR set may be determined using, for example, the example shown in FIG. 10, which utilizes one or more of depth information (e.g., a depth map), motion information, and/or an MVP (e.g., an MVP size such as an average MVP size). In some examples, an AMVR set may be determined using previously decoded frames or may be computed offline using a training set (e.g., a large training set). An AMVR set may be determined using an algorithm (e.g., a machine learning algorithm). Once an AMVR set is determined, in an example (e.g., Table 5), an index to the chosen AMVR set may be signaled to a device (e.g., a decoder). The device may be configured with (e.g., know) a pre-defined dictionary of AMVR sets. In another example (e.g., Table 6), an AMVR set or AMVR sets may be (e.g., explicitly) signaled in the slice header. The device may decode the AMVR set, for example, from the bitstream.

Table 5 shows an example syntax where an index to a pre-defined dictionary of AMVR set(s) (e.g., one present on both encoder and decoder side) may be signaled.

TABLE 5

| Example syntax used to signal an AMVR set index at a slice level |  |
| --- | --- |
| if( sh_slice_type != I ) { | |
| ... | |
| if( sps_amvr_enabled_flag ) | |
| sh_amvr_set_idc | u(n) |
| ... | |
| } | |

Table 6 shows an example syntax where an AMVR set may be adaptively determined at the encoder side (e.g., the AMVR set may not be previously known to the decoder).

TABLE 6

| Example syntax to signal an AMVR set for a (e.g., each) slice, for example, in a slice header |  |
| --- | --- |
| if( sh_slice_type != I ) { | |
| ... | |
| if( sps_amvr_enabled_flag ) | |
| sh_signal_amvr_set_flag | u(1) |
| if(sh_signal_amvr_set_flag) | |
| sh_num_amvr_set | u(n) |
| for(i=0; i < sh_num_amvr_set; i++) | |
| amvr_precision_set[i] | u(n) |
| ... | |
| } | |

An AMVR enablement indication (e.g., AMVR enabled flag) may be signaled at the slice level. As shown in the examples herein, an AMVR set may be signaled at a slice level. In those examples, an indication (e.g., a flag) may be coded at the slice level to enable or disable an AMVR tool. In some examples, an AMVR enablement indication (e.g., an AMVR tool enable/disable flag) may be added at a picture level.

Depth information (e.g., depth features) and/or motion information (e.g., motion features) may be used when determining the indication. For example, an AMVR tool may be disabled for a frame with a global motion that is above a certain value (e.g., a certain threshold). The use of this indication is not limited to the availability of depth information (e.g., depth data) and/or motion information (e.g., motion data). This indication may be used when encoding and/or decoding mixed content where a frame or a set of frames (e.g., a sequence) may be include screen content, gaming content, and/or natural content. For screen content (e.g., when a sub-pel accuracy of MV doesn't achieve a gain), this indication may be disabled. Table 7 shows example syntax in the picture header. Table 8 shows example syntax in the slice header.

TABLE 7

Example picture header syntax

| ... | |
|---|---|
| if( sps_mmvd_fullpel_only_enabled_flag ) | |
|   ph_mmvd_fullpel_only_flag | u(1) |
| presenceFlag = 0 | |
| if( sps_amvr_enabled_flag ) | |
|   ph_amvr_enabled_flag | u(1) |
| .... | |

TABLE 8

Example slice header syntax

| if( sh_slice_type != I ) { | |
|---|---|
| ... | |
|   if( sps_amvr_enabled_flag ) | |
|     sh_amvr_enabled_flag | u(1) |
| ... | |
| } | |

Progressive AMVR encoder acceleration may be achieved in one or more examples herein. $MV_{actual}$ refers to the actual MV of a block derived using a block motion estimation algorithm (e.g., a diamond search) employed at an encoder. $MV_{predicted}$ refers one or more MVPs obtained from the neighboring blocks in the current frame or collocated block(s) in the previous frame. $MV_{inferred}$ may be derived from the motion field (MF) of a block obtained from motion information (e.g., input motion data typically from a game engine) as shown in Equations 4.4, 4.5, and 4.6.

$$MF_{avg_x} = \frac{1}{M*N}\sum_{i=1}^{N}\sum_{j=1}^{M}MF_x \qquad (4.4)$$

$$MF_{avg_y} = \frac{1}{M*N}\sum_{i=1}^{N}\sum_{j=1}^{M}MF_y \qquad (4.5)$$

$$MV_{inferred} = |MF_{avg_x}| + |MF_{avg_y}| \qquad (4.6)$$

This example using Equations 4.4, 4.5, and 4.6 may be applied to a device (e.g., only on the encoder side), for example, to speed-up PMVR schemes. A compute intensive process of the derivation of $MV_{actual}$ may be skipped. An actual motion may be replaced by the motion information inferred from an input motion map. Then a predictor (e.g., each predictor) $MV_{predicted}$ may be compared directly with this inferred motion $MV_{inferred}$. If $MV_{predicted}$ and $MV_{inferred}$ are close (e.g., based on a determination using a value), a finer MV resolution may be chosen. If $MV_{predicted}$ and $MV_{inferred}$ are not close, a coarser MV resolution may be chosen. In examples, the value(s) (threshold value(s) used for the comparison may be empirically derived.

In some examples, an early termination may be performed based on an occlusion map. The PMVR speed-up (in one or more examples herein) may be terminated when an occlusion is detected inside the current block. The encoder may have access to additional information on occlusions through an occlusion map.

In some examples, an early termination may be performed based on a motion block variance. An early termination may be based on the variance of motion field (MF) inside a CU. A variance may be computed in the horizontal direction and/or the vertical direction. A sum of variance may be computed and/or compared to a value (e.g., pre-defined threshold $TH_{mf}$). When the variance is higher than the value, the PMVR speed-up (in one or more examples herein) may end (e.g., may be exited).

A device may perform method 1400 as described in FIG. 14. FIG. 14 illustrates an example of a method for obtaining an AMVR parameter associated with at least one of a depth map of a video block, a motion map of the video block, or an average motion vector predictor size. For example, the device may obtain the AMVR parameter associated with the at least one of the depth map of the video block, the motion map of the video block, or the average motion vector predictor size at 1404 and process the video block based on the obtained AMVR parameter at 1406. The device may be a decoder (e.g., the decoder shown in FIG. 3) or an encoder (e.g., the encoder shown in FIG. 2).

A device may perform method 1500 as described in FIG. 15. FIG. 15 illustrates an example of a method for sending an obtained AMVR parameter or an indication of the obtained AMVR parameter. For example, the device may obtain the AMVR parameter based on at least one of a depth map of a video block, a motion map of the video block, or an average motion vector predictor size at 1504 and send the obtained AMVR parameter or the indication of the obtained AMVR parameter at 1506. The device may be a decoder (e.g., the decoder shown in FIG. 3) or an encoder (e.g., the encoder shown in FIG. 2).

Decoding tools and techniques including one or more of entropy decoding, inverse quantization, inverse transformation, and differential decoding may be used to enable the method as described in FIG. 5 in the decoder. These decoding tools and techniques may be used to enable one or more of obtaining an adaptive motion vector resolution (AMVR) parameter associated with at least one of a depth map of a video block, a motion map of the video block, or an average motion vector predictor size; processing the video block based on the obtained AMVR parameter that is associated with the at least one of the depth map of the video block, the motion map of the video block, or the average motion vector predictor size; obtaining the AMVR parameter based on the at least one of the depth map of the video block, the motion map of the video block, or the average motion vector predictor size; receiving an indication of the AMVR parameter, for example, at a slice level via a bitstream; obtaining the AMVR parameter according to the indication of the AMVR parameter; selecting an AMVR index from a plurality of AMVR indices based the at least one of the depth map of the video block, the motion map of the video block, or the average motion vector predictor size; selecting the AMVR set from a plurality of AMVR sets based on the at least one of the depth map of the video block, the motion map of the video block, or the average motion vector predictor size; receiving an indication of the AMVR enablement, for example, at a picture level or at a slice level via a bitstream and processing the video block using the indication of the AMVR enablement; determining a precision level of motion vector information (e.g., an MVD) associated with the video block based on the indication of motion associated with the video block; decoding the motion vector information associated with the video block using the precision level.

Encoding tools and techniques including one or more of quantization, entropy coding, inverse quantization, inverse transformation, and differential coding may be used to enable the method as described herein in the encoder. These encoding tools and techniques may be used to enable one or more of obtaining an AMVR parameter based at least one of a depth map of a video block, a motion map of the video block, or an average motion vector predictor size; sending the obtained AMVR parameter or an indication of the obtained AMVR parameter; sending the obtained AMVR parameter or an indication of the obtained AMVR parameter, for example, to a device in a bitstream; sending the indication of the AMVR parameter at a slice level; determining whether to enable AMVR for the video block and sending an indication of whether to enable AMVR for the video block in a bitstream, for example, at a picture level or at a slice level; selecting the AMVR index from a plurality of AMVR indices based on the at least one of the depth map of the video block, the motion map of the video block, or the average motion vector predictor size; selecting the AMVR set from a plurality of AMVR sets based on the at least one of the depth map of the video block, the motion map of the video block, or the average motion vector predictor size; determining a precision level of motion vector information (e.g., an MVD) associated with the video block based on the indication of motion associated with the video block; encoding the motion vector information associated with the video block using the precision level.

A syntax element(s) may be inserted in the signaling, for example, to enable the decoder to identify an indication associated with performing the method as described in FIG. 14 or 15, or the method to use. For example, the syntax element may include one or more of sh_amvr_enabled_flag, ph_amvr_enabled_flag, sh_signal_amvr_set_flag, sh_amvr_set_idc, sh_num_amvr_set, or amvr_precision_set [i]. As an example, the decoder may determine whether to enable AMVR at slice level based on an indication sh_amvr_enabled_flag.

While the examples provided herein may assume that media content is streamed to a display device, there is no specific restriction on the type of display device that may benefit from the example techniques described herein. For example, the display device may be a television, a projector, a mobile phone, a tablet, etc. Further, the example techniques described herein may apply to not only streaming use cases, but also teleconferencing settings. In addition, a decoder and a display as described herein may be separate devices or may be parts of a same device. For example, a set-top box may decode an incoming video stream and provide (e.g., subsequently) the decoded stream to a display device (e.g., via HDMI), and information regarding viewing conditions such as a viewing distance may be transmitted from the display device to the set-top box (e.g., via HDMI).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A device for decoding video content, comprising:
a processor configured to:
  obtain depth information associated with a video block, wherein the depth information associated with the video block indicates a distance from a reference point associated with a virtual camera;
  determine a precision level of a motion vector difference (MVD) associated with the video block based on the depth information associated with the video block; and
  decode the MVD associated with the video block based on the precision level of the MVD.

2. The device of claim 1, wherein adaptive motion vector resolution (AMVR) is enabled for the video block, wherein the processor is further configured to determine an AMVR index for the video block based on the depth information associated with the video block, and wherein the precision level of the MVD is determined based on the AMVR index.

3. The device of claim 1, wherein adaptive motion vector resolution (AMVR) is enabled for the video block, and wherein the processor is further configured to modify or reorder an AMVR set based on the depth information associated with the video block.

4. The device of claim 1, wherein the processor is further configured to:
  receive the MVD associated with the video block in video data signaled to the device; and
  determine the precision level of the MVD associated with the video block based on the video data.

5. The device of claim 1, wherein adaptive motion vector resolution (AMVR) is enabled for the video block, and wherein the processor is further configured to:
  obtain a set of AMVR indices; and
  select an AMVR index for the video block from the set of AMVR indices based on the depth information associated with the video block, wherein the precision level of the MVD is determined based on the AMVR index.

6. The device of claim 1, wherein adaptive motion vector resolution (AMVR) is enabled for the video block, and wherein the processor is further configured to:
  obtain a plurality of AMVR sets; and
  select an AMVR set for the video block from the plurality of AMVR sets based on the depth information associated with the video block, wherein the precision level of the MVD is determined based on an AMVR index of the selected AMVR set.

7. A device for encoding video content, comprising:
a processor configured to:
  obtain depth information associated with a video block, wherein the depth information associated with the video block indicates a distance from a reference point associated with a virtual camera;
  determine a precision level of a motion vector difference (MVD) associated with the video block based on the depth information associated with the video block; and
  encode the MVD associated with the video block based on the precision level of the MVD.

8. The device of claim 7, wherein adaptive motion vector resolution (AMVR) is enabled for the video block, wherein the processor is further configured to determine an AMVR index for the video block based on the depth information associated with the video block, and wherein the precision level of the MVD is determined based on the AMVR index.

9. The device of claim 7, wherein adaptive motion vector resolution (AMVR) is enabled for the video block, and wherein the processor is further configured to modify or reorder an AMVR set based on the depth information associated with the video block.

10. A method for decoding video content, comprising:

obtaining depth information associated with a video block, wherein the depth information associated with the video block indicates a distance from a reference point associated with a virtual camera;

determining a precision level of a motion vector difference (MVD) associated with the video block based on the depth information associated with the video block; and decoding the MVD associated with the video block based on the precision level of the MVD.

11. The method of claim 10, wherein adaptive motion vector resolution (AMVR) is enabled for the video block, wherein the method comprises determining an AMVR index for the video block based on the depth information associated with the video block, and wherein the precision level of the MVD is determined based on the AMVR index.

12. The method of claim 10, wherein adaptive motion vector resolution (AMVR) is enabled for the video block, and wherein the method further comprises modifying or reordering an AMVR set based on the depth information associated with the video block.

13. The method of claim 10, further comprising:

receiving the MVD associated with the video block in video data; and determining the precision level of the MVD associated with the video block based on the video data.

14. The method of claim 10, wherein adaptive motion vector resolution (AMVR) is enabled for the video block, and wherein the method further comprises:

obtaining a set of AMVR indices; and selecting an AMVR index for the video block from the set of AMVR indices based on the depth information associated with the video block, wherein the precision level of the MVD is determined based on the AMVR index.

15. The method of claim 10, wherein adaptive motion vector resolution (AMVR) is enabled for the video block, and wherein the method further comprises:

obtaining a plurality of AMVR sets; and selecting an AMVR set for the video block from the plurality of AMVR sets based on the depth information associated with the video block, wherein the precision level of the MVD is determined based on an AMVR index of the selected AMVR set.

16. A method for encoding video content, comprising:

obtaining depth information associated with a video block, wherein the depth information associated with the video block indicates a distance from a reference point associated with a virtual camera;

determining a precision level of a motion vector difference (MVD) associated with the video block based on the depth information associated with the video block; and encoding the MVD associated with the video block based on the precision level of the MVD.

17. The method of claim 16, wherein adaptive motion vector resolution (AMVR) is enabled for the video block, wherein the method further comprises determining an AMVR index for the video block based on the depth information associated with the video block, and wherein the precision level of the MVD is determined based on the AMVR index.

18. The method of claim 16, wherein adaptive motion vector resolution (AMVR) is enabled for the video block, and wherein the method further comprises modifying or reordering an AMVR set based on the depth information associated with the video block.

19. The method of claim 16, wherein adaptive motion vector resolution (AMVR) is enabled for the video block, and wherein the method further comprises:

obtaining a set of AMVR indices; and selecting an AMVR index for the video block from the set of AMVR indices based on the depth information associated with the video block, wherein the precision level of the MVD is determined based on the AMVR index.

* * * * *